(12) United States Patent
Wentworth et al.

(10) Patent No.: US 8,157,478 B2
(45) Date of Patent: Apr. 17, 2012

(54) ROD PUSHING AND PULLING MACHINE

(75) Inventors: Steven W. Wentworth, Brookfield, WI (US); Robert F. Crane, Oconomowoc, WI (US)

(73) Assignee: Earth Tool Company, LLC, Oconomowoc, WI (US)

( * ) Notice: Subject to any disclaimer, the term of this patent is extended or adjusted under 35 U.S.C. 154(b) by 214 days.

(21) Appl. No.: 11/407,679

(22) Filed: Apr. 20, 2006

(65) Prior Publication Data
US 2006/0193697 A1 Aug. 31, 2006

Related U.S. Application Data

(63) Continuation-in-part of application No. 10/916,117, filed on Aug. 11, 2004, now Pat. No. 7,140,806.

(51) Int. Cl.
*F16L 1/028* (2006.01)
(52) U.S. Cl. ........................................................ 405/184
(58) Field of Classification Search ................ 254/29 R; 405/174, 184, 184.1, 184.3, 175, 177, 183.5
See application file for complete search history.

(56) References Cited

U.S. PATENT DOCUMENTS

| | | | |
|---|---|---|---|
| 1,295,320 A | 2/1919 | Humphryes | |
| 1,442,164 A | 1/1923 | Ludlum et al. | |
| 2,209,885 A | 7/1940 | Hall et al. | |
| 3,726,506 A | 4/1973 | Vanderwaal et al. | 254/29 |
| 3,834,668 A * | 9/1974 | Casey | 254/29 R |
| 3,998,428 A * | 12/1976 | Miles | 254/29 R |
| 4,000,879 A | 1/1977 | Martin et al. | 254/29 R |
| 4,299,375 A | 11/1981 | Schosek | 254/29 R |
| 4,368,873 A | 1/1983 | Perry | 254/29 R |
| 4,434,969 A | 3/1984 | Von Ruden | 254/29 R |
| 4,507,019 A | 3/1985 | Thompson | 405/154 |
| 4,662,606 A | 5/1987 | Akesaka | 254/29 R |
| 4,955,757 A * | 9/1990 | Balling | 405/184 |
| 5,205,671 A * | 4/1993 | Handford | 405/184.3 |
| 5,206,980 A * | 5/1993 | Chapman | 29/237 |
| 5,240,352 A | 8/1993 | Ilomaki | 405/184 |
| 5,439,320 A * | 8/1995 | Abrams | 405/184.3 |
| 5,439,329 A | 8/1995 | Marron | 408/1 R |
| 5,520,072 A | 5/1996 | Perry | 81/57.16 |
| 5,740,703 A | 4/1998 | Perry | 81/57.34 |
| 6,299,382 B1 | 10/2001 | Wentworth | 405/184 |
| 6,305,880 B1 | 10/2001 | Carter et al. | 405/184.3 |
| 6,443,657 B1 | 9/2002 | Brahler | 405/154 |
| 6,761,507 B2 | 7/2004 | Wentworth et al. | 405/484.3 |
| 2002/0081155 A1* | 6/2002 | Putnam | 405/184 |
| 2003/0165360 A1 | 9/2003 | Wentworth et al. | 405/184.3 |
| 2004/0146361 A1* | 7/2004 | Hau | 405/184.1 |
| 2004/0265067 A1* | 12/2004 | Putnam | 405/184.3 |
| 2006/0099035 A1* | 5/2006 | Wentworth | 405/184.1 |

* cited by examiner

*Primary Examiner* — Sunil Singh
(74) *Attorney, Agent, or Firm* — Tomlinson Rust McKinstry Grable

(57) ABSTRACT

The invention relates to an improved rod pushing and pulling machine suited for use in underground pipe bursting and replacement with a rod string wherein each rod has at least one radially enlarged upset thereon. The machine includes a housing or frame having a front wall with an access opening therein through which a rod string can extend. At least one main thrust cylinder is mounted on the housing. A movable carriage connected to the thrust cylinder engages the rod, drives it in a pushing or pulling direction, and then releases it for another stroke. Between strokes, a "bungee" vise holds the rod string so that it does not slip back in the opposite direction.

28 Claims, 29 Drawing Sheets

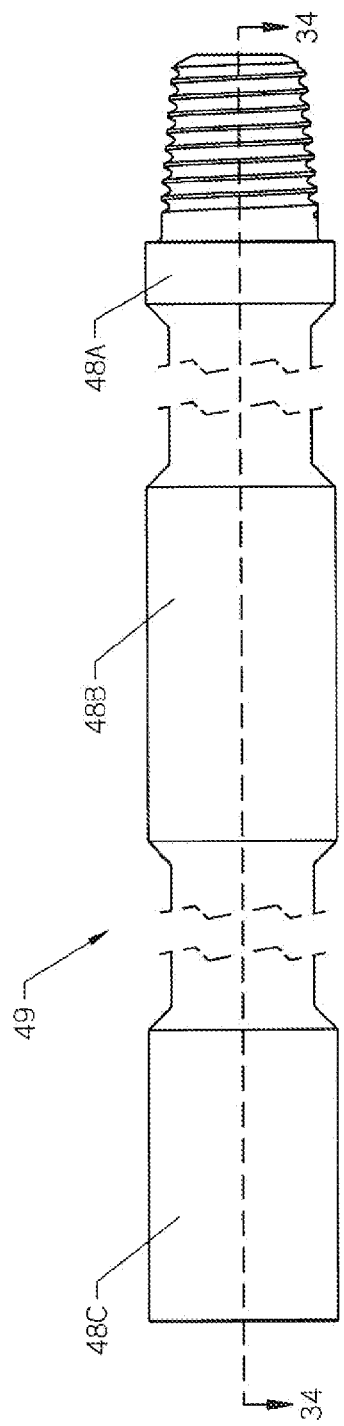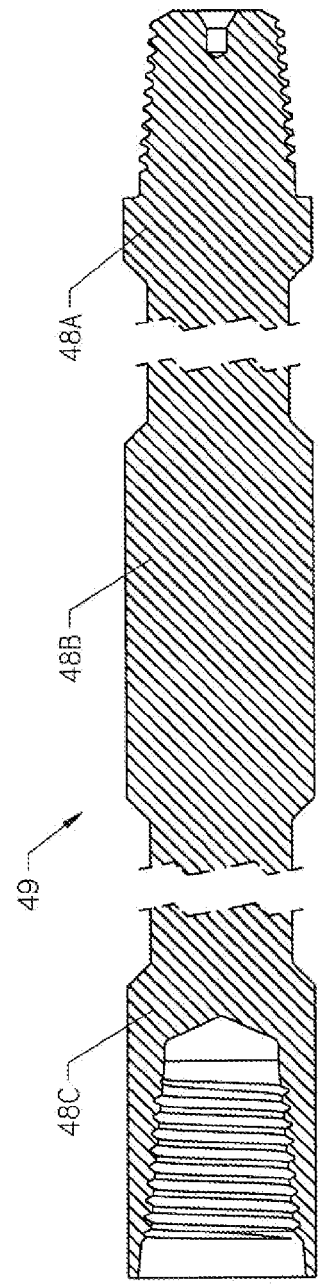

ROD PUSHING AND PULLING MACHINE

This application is a continuation in part of commonly-assigned U.S. Ser. No. 10/916,117, filed Aug. 11, 2004, U.S. Pat. No. 7,140,806 issued Nov. 28, 2006.

TECHNICAL FIELD

The invention relates to underground pipe bursting and replacement systems of the static type which operate by pushing or pulling a string of rods to which a bursting head or other tooling is attached.

BACKGROUND OF THE INVENTION

Pipe bursting is a well known process that brings enormous potential for the efficient and unobtrusive replacement of buried pipelines. Static bursting systems have been used for that purpose. Such systems pull or push a string of rods through the ground or existing pipeline. See for example Handford U.S. Pat. No. 5,205,671. Such systems generally provide a mechanism for both pulling/pushing the rod string and for adding and removing sections of rod to-the end of the string. Most commonly, the rod strings used by these machines are made from consecutive cylindrical steel rods that are threaded together end to end as the rod string advances through the ground. Spinner mechanisms used to thread and unthread rods are known in the art, such as shown in the Handford patent cited above.

More recently static bursting systems have been proposed that make use of rods with radial protrusions or upsets intended to be grasped by the pipe pushing-pulling mechanism. One such mechanism is described in commonly-assigned U.S. Ser. No. 10/916,117, filed Aug. 11, 2004, United States Patent Application 20060034666, Feb. 16, 2006, the entire contents of which are incorporated herein by reference. The described method relies on rods that have enlarged shoulders. Another system for pushing and pulling rods with annular flanges is described in Puttman U.S. Pat. No. 5,980,157.

A need has emerged for a simple and durable mechanism for pushing or pulling a string of rods as part of an earth boring or pipe bursting operation, especially rods with radial protrusions or upsets intended to be grasped by the pipe pushing-pulling mechanism in a manner that provides reduced wear and slippage. The present invention addresses this need.

SUMMARY OF THE INVENTION

The present invention relates to an improved rod pushing and pulling machine suited for use in underground pipe bursting and replacement. For purposes of the invention, a "rod string" refers to a series of rods joined end to end. A rod pushing and pulling machine according to one aspect of the invention is adapted for use with a rod string wherein each rod has at least one radially enlarged upset thereon. The machine includes a housing or frame having a front wall with an access opening therein through which a rod string can extend. At least one main thrust cylinder is mounted on the housing. A movable carriage connected to the thrust cylinder engages the rod, drives it in a pushing or pulling direction, and then releases it for another stroke. Between strokes, a "bungee" vise holds the rod string so that it does not slip back in the opposite direction.

According to a preferred form of the invention, the carriage comprises a ratchet block mechanism driven by the main thrust cylinder. The ratchet block mechanism includes a pivoting pawl and a reversible stop mechanism that permits the pawl to swing out of the way of an upset on a rod as the ratchet block mechanism moves along the rod in one direction, but forces the pawl to engage the upset to drive the rod string when the ratchet block mechanism moves along the rod in the other direction. In this embodiment, the bungee vise is mounted on the housing behind the ratchet block mechanism, the bungee vise having a pair of jaws and an actuator that causes the jaws to engage the rod string and hold it against longitudinal movement when the rod string is not engaged by the ratchet block mechanism, and disengage when the rod string is engaged by the ratchet block mechanism.

Optionally, a spinner is used to thread and unthread rods from the string. The spinner can be incorporated into the movable carriage as described in commonly-assigned U.S. Ser. No. 10/916,117, filed Aug. 11, 2004, the entire contents of which are incorporated by reference herein. In the alternative, the spinner can be provided as a separate component. In a preferred embodiment, the spinner is mounted on the housing behind the bungee vise. The spinner includes a drive wheel and a motor connect to actuate the drive wheel, the drive wheel being positioned to engage an endmost rod of the rod string and couple or uncouple it from the rod string depending on the direction of rotation of the drive wheel. The spinner may include a torque vise positioned to engage the last rod of the rod string and "break" the joint (unthread the last rod part way) as the second to last rod is held by the bungee vise, after which the drive wheel unthreads the last rod the rest of the way. Preferably the torque vise is also used after the spinner has threaded a new rod to the string during payout to tighten the joint to a uniform desired tightness. If the spinner and torque vise are omitted, rods are threaded on and off manually by a worker, using a wrench when necessary. This reduces the size and cost of the machine, but decreases performance.

The invention further provides an improved spinner for use in a rod pushing or pulling machine of the type that uses threaded rods. The spinner includes a spinning mechanism having a drive wheel and a motor connected to actuate the drive wheel, the drive wheel being positioned to engage a last rod of the rod string and couple or uncouple it from the rod string depending on the direction of rotation of the drive wheel. Dual drive rollers may be provided, or the rod string may be engaged by idler rollers on the side opposite the drive roller. As a second component the spinner has a torque vise preferably mounted next to the spinning mechanism on a common frame. The torque vise serves to grip the last rod of the string with a pair of jaws and then rotate it over a limited angle (generally less than 90 degrees) in order to loosen it from the next to last rod section. Once this is done, the torque vise releases the rod and the spinning mechanism engages it to unthread it the rest of the way. This aspect of the invention allows use of a much smaller spinning mechanism than would otherwise be needed to uncouple rods that are very tightly coupled. In the reverse operation used during payout, the spinner threads a new rod onto the end of the drill string, and the torque vise then rotates it over a limited angle in order to tighten it.

According to another aspect of the invention, rods are provided with radial upsets spaced at intervals that when the rods are assembled end-to-end to form a drill string, the spacing between upsets corresponds to the stroke length of the main thrust cylinder. For this purpose, a rod according to the invention it configured for use in making a rod string for a hydraulic rod pushing and pulling machine. Each rod has male and female threaded ends, at least two radial upsets at spaced positions along the length of the rod, and at least two minor diameter portions adjacent to the radial upsets. Each minor diameter portion has a lesser diameter than the upsets along its entire length, and has a length equal to at least 25% of the length of the rod. In the illustrated embodiment, there are no more than two upsets per rod; for this purpose partial upsets at the male and female ends count as a single one when the rod is assembled as part of the rod string.

The invention further provides a method of operating a rod pushing and pulling machine on a rod string. The machine includes a housing with a front shore plate having an access opening therein through which the rod string extends, a carriage that releasably engages the rod string, a hydraulic thrust cylinder for pushing or pulling the rod string engaged by the carriage upon extension or retraction of the thrust cylinder, and a bungee vise mounted on the housing. The method includes the steps of engaging the rod string with the carriage, pulling or pushing the rod string with the carriage by actuating the hydraulic thrust cylinder, engaging the rod string with the bungee vise, releasing the rod string from the carriage, operating the hydraulic thrust cylinder to reposition the carriage for another stroke as the rod string is held by the bungee vise, re-engaging the rod string with the carriage, and releasing the rod string from the bungee vise. These steps are repeated in a cyclical fashion. These and other aspects of the invention are further described in the detailed description which follows.

BRIEF DESCRIPTION OF THE DRAWINGS

FIG. 33 is a side elevation of a rod according to the invention; and

FIG. 34 is a lengthwise section along the line 34-34 in FIG. 33.

DETAILED DESCRIPTION

Figure 1:
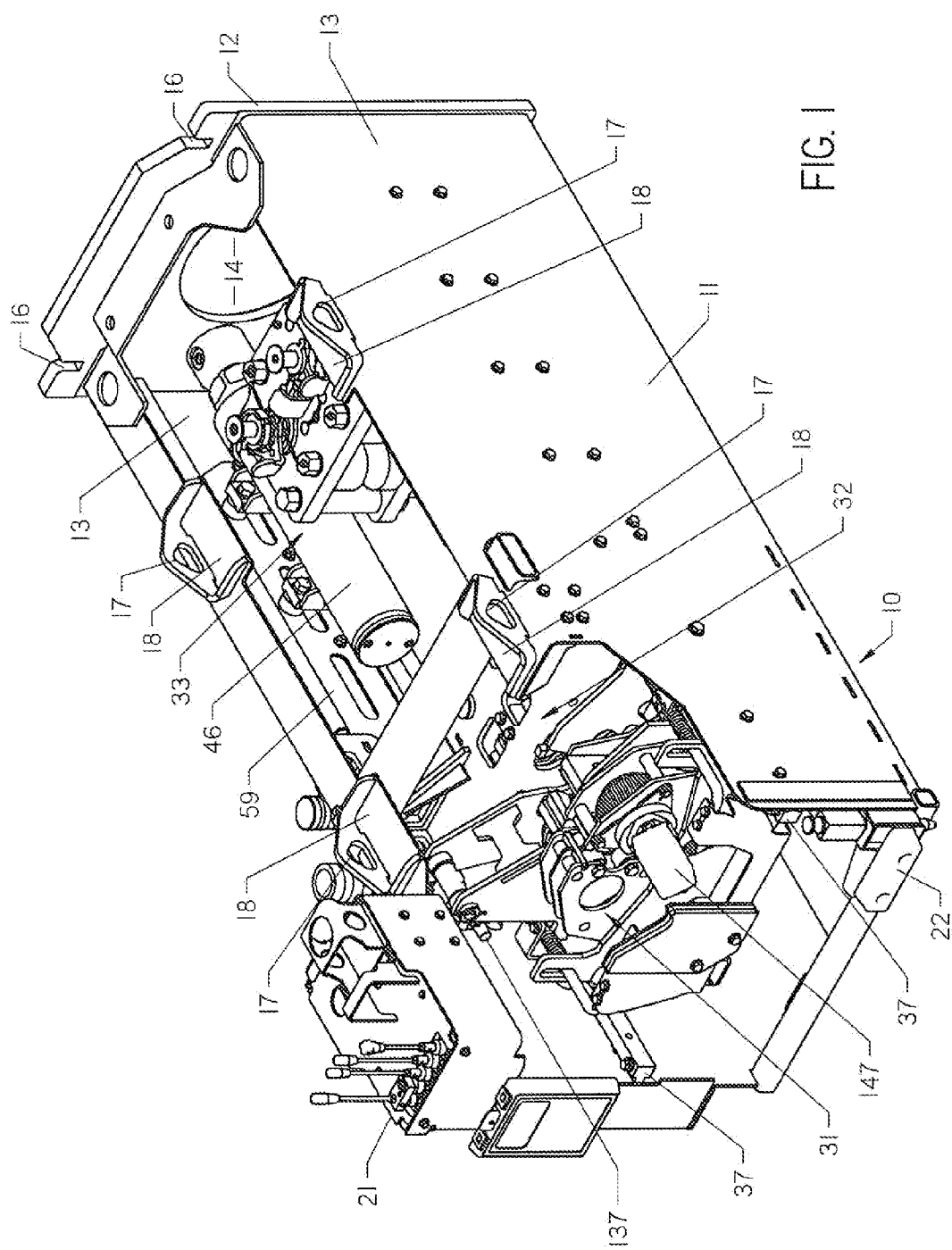
FIG. 1 is a perspective view of a pipe pulling and pushing machine according to the invention.
Figure 2:
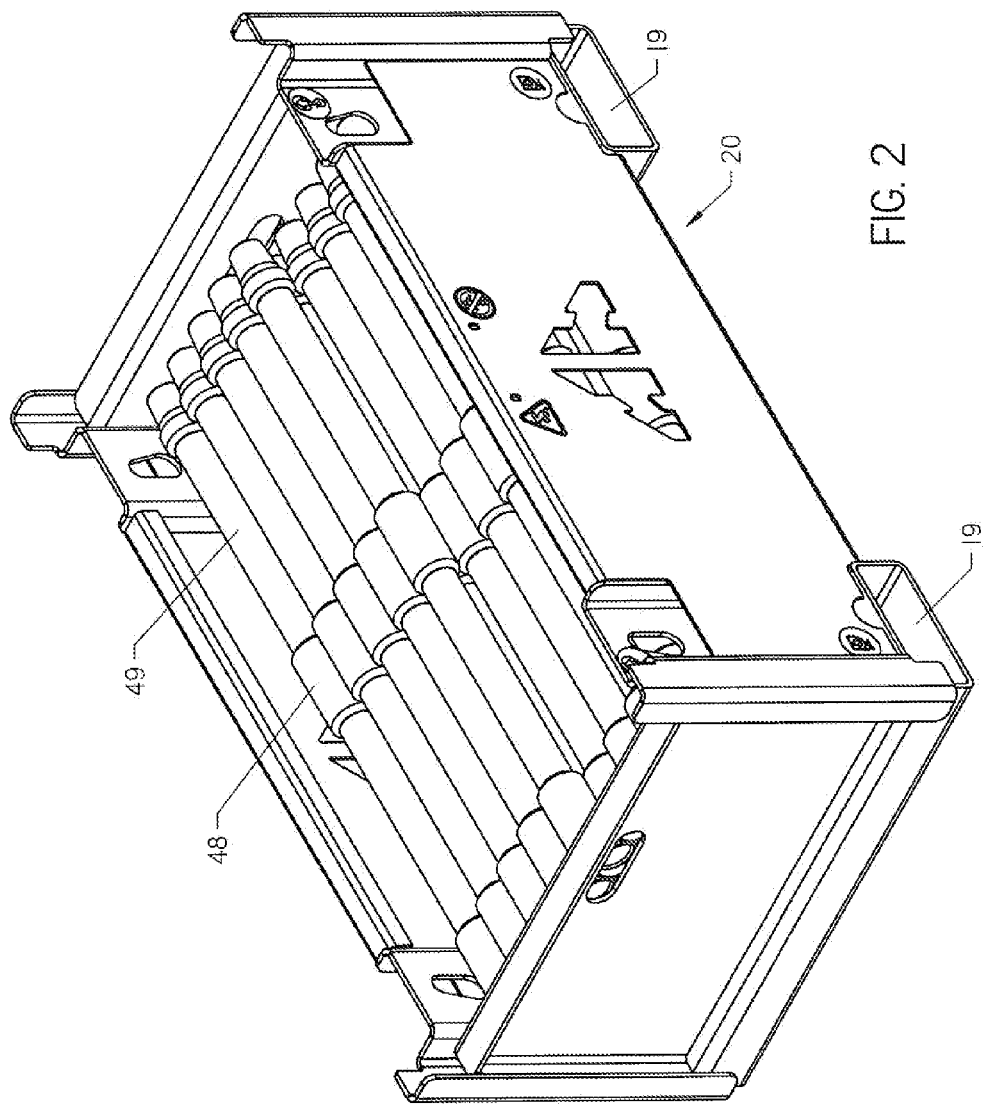
FIG. 2 is a perspective view of a rod box for use with the machine of FIG. 1.
Figure 3:
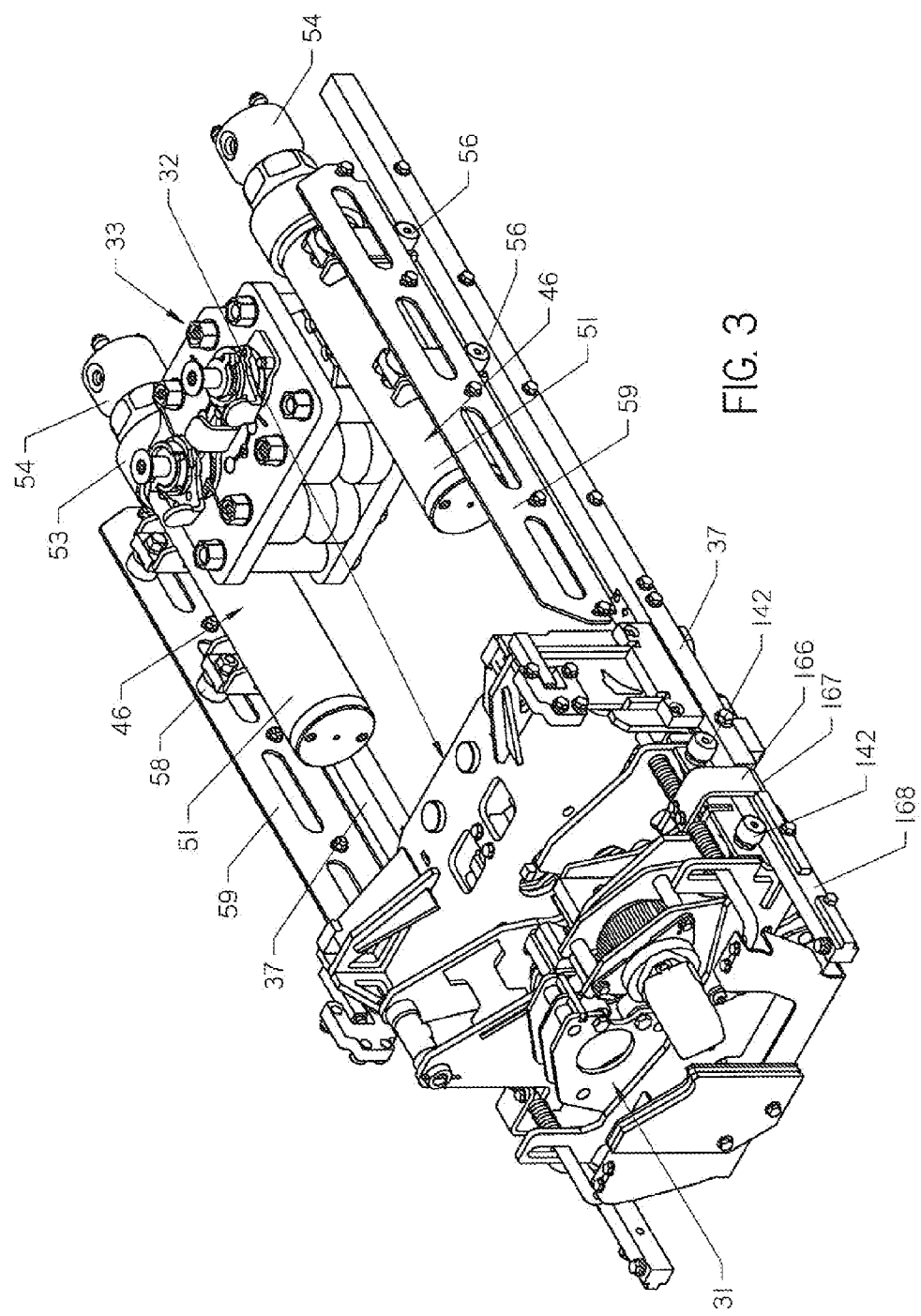
FIG. 3 is a perspective view of the main components shown in FIG. 1, with the machine hull removed.
Figure 4:
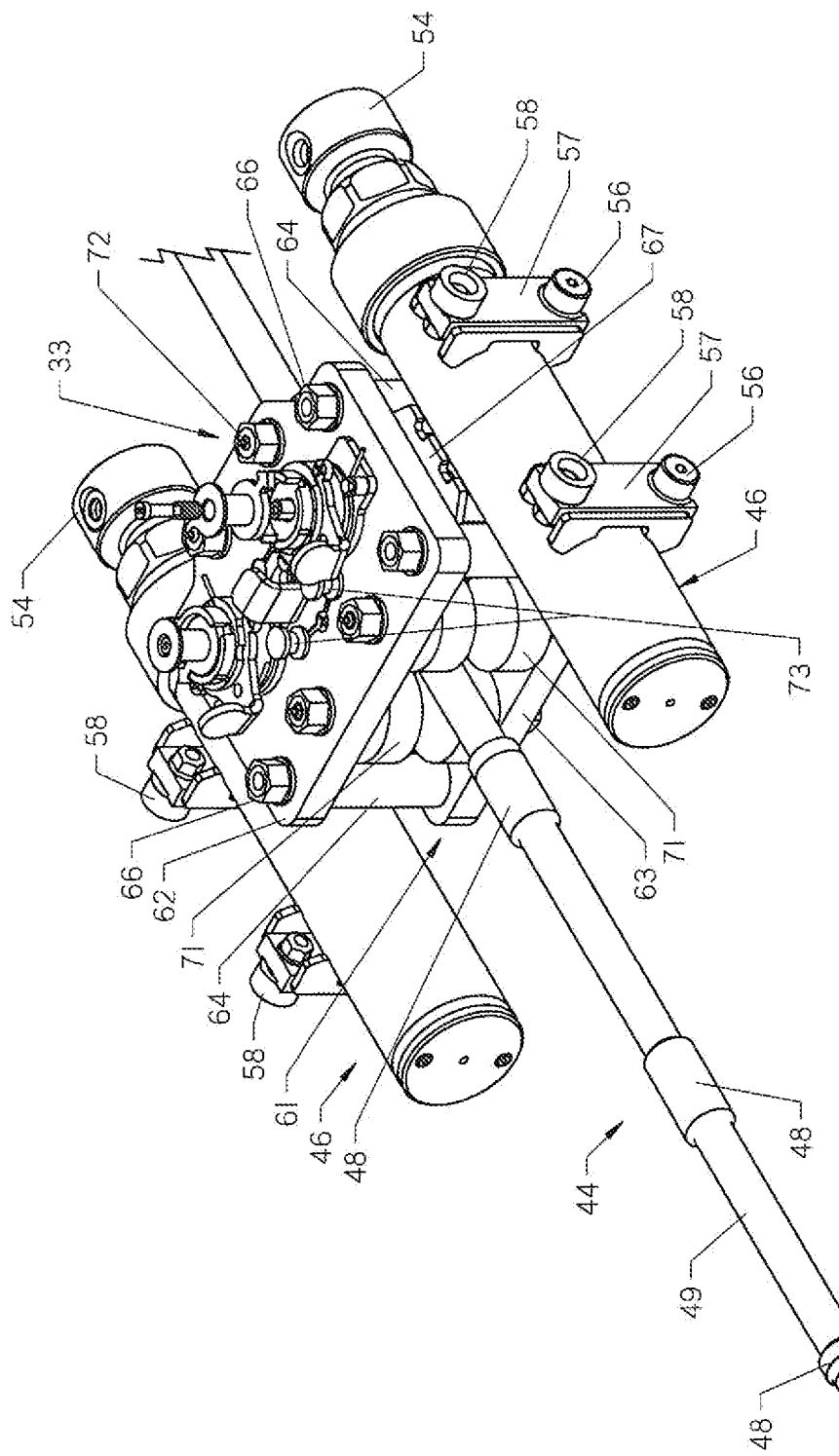
FIG. 4 is a perspective view of the ratchet block mechanism shown in FIG. 1.
Figure 5A:
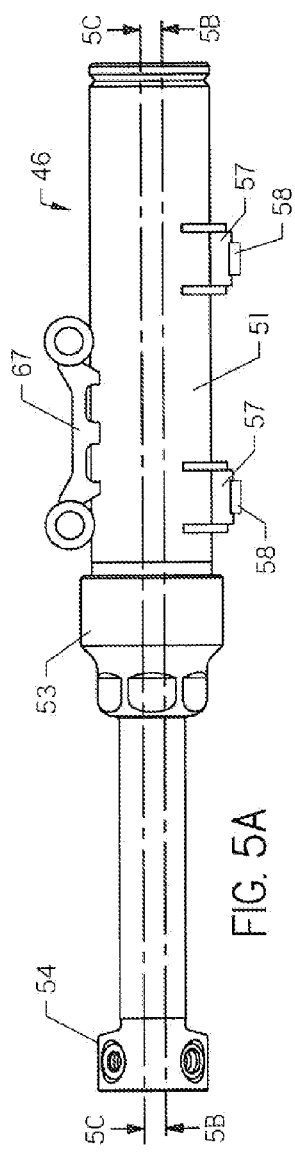
FIG. 5A is a top view of a hydraulic cylinder shown in FIG. 1.
Figure 5B:
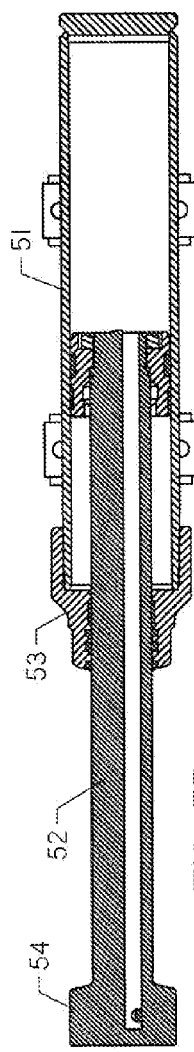
FIG. 5B is a sectional view taken along the line 5B-5B in FIG. 5A.
Figure 5C:
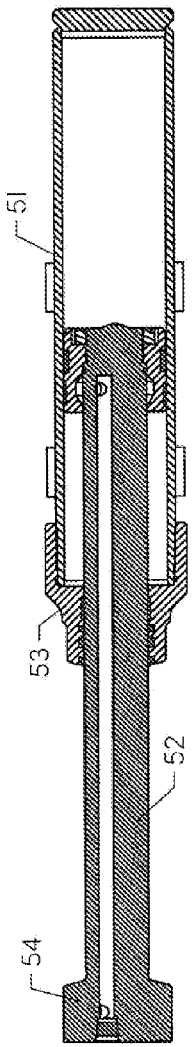
FIG. 5C is a sectional view taken along the line 5C-5C in FIG. 5A.

Referring now to FIGS. 1-3, a pipe pulling and pushing machine 10 according to the invention includes a hull 11 comprising a weldment including a front shore plate 12 and pair of side walls 13. Front shore plate 12 has a large centrally located hole 14 used for clearance to pull in tooling at the completion of the burst job. Front shore plate 12 has notches 16 in its upper edge that allow mounting of a second, removable shore plate. Sets of front and rear eyes 17 are provided on hull 11 for lifting machine 10 into and out of an access pit. Eyes 17 are formed in upturned flanges of four brackets 18 that receive the feet 19 of a rod storage box 20 therein. Operation of machine 10 is accomplished from a control station 21 mounted on an upper rear corner of hull 11. One component controlled from control station 21 is a hydraulic motor 147 described further below which provides torque to thread or unthread the rod joints. An optional L-shaped foot 22 is provided at the right rear corner of hull 11 can be pulled out in order to stabilize machine 10 in a pit.

Machine 10 has as its main components a spinner 31 used to couple and uncouple threaded rods to the end of the rod string, a "bungee" vise mechanism 32 that is operated to keep the rod string in tension when needed, and a ratchet block mechanism 33 according to the invention which cyclically engages a rod string 44 to push or pull it through the ground or an existing pipeline to be burst. Spinner 31 is mounted behind vise mechanism 32 by means of rollers 36 that ride on a pair of rails 37 mounted on the insides of walls 13.

A pair of thrust cylinders 46 drive ratchet block assembly 33, which engages rod upsets 48 to propel the rods forward or back at the operator's discretion. Each of rods 49 forming the rod string 44 has upsets 48 at the center and at each end of the rod. Cylinders 46 each include a cylinder body 51, a rod 52, a rod seal carrier 53 and a flange 54 at the distal end of rod 52 for bolting cylinders 46 to shore plate 12. Cylinder seal carrier 53 threads onto cylinder body 51. Track rollers 56 are mounted on brackets 57 which are welded to cylinder body 51 to support cylinders 46 and ratchet block assembly 33. Plastic sliding guide bearings 58 positioned above rollers 56 on brackets 57 ride against a pair of guide panels 59 secured to the inside of walls 13 to keep the aforementioned assembly centered in the hull 11.

Referring to FIGS. 4 to 7, rod string 44 passes through the center of ratchet block assembly 33. Assembly 33 includes a frame 61 that includes a pair of upper and lower rectangular plates 62, 63 secured at its corners by threaded rods 64 and nuts 66 at each corner of plates 62, 63. Frame 61 is secured to the adjoining cylinder bodies 51 by welded ribs 67. Pairs of front and rear idler guide rollers 71 keep rod string 44 centered in the assembly. A set of rods 72 similar to rods 64 function as the axles for idler rollers 71 and add further structural stiffness to frame 61.

Plates 62, 63 mount the components of ratchet block assembly 33 that function to control movement of the rod string 44. A pair of direction pins 73 in one of two sets of holes 74, 76 on opposite sides of drill string 44 are used to set the direction of a pair of ratchet pawls or gates 77 for mounting on a pair of pivotable pawl shafts 78 for either pullback or payout of rod string 44, respectively. A pair of seal carriers 75 provide mounts for grease seals of pawl shafts 78. Set screws 79 secured pawls to shafts 78.

Figure 6A:
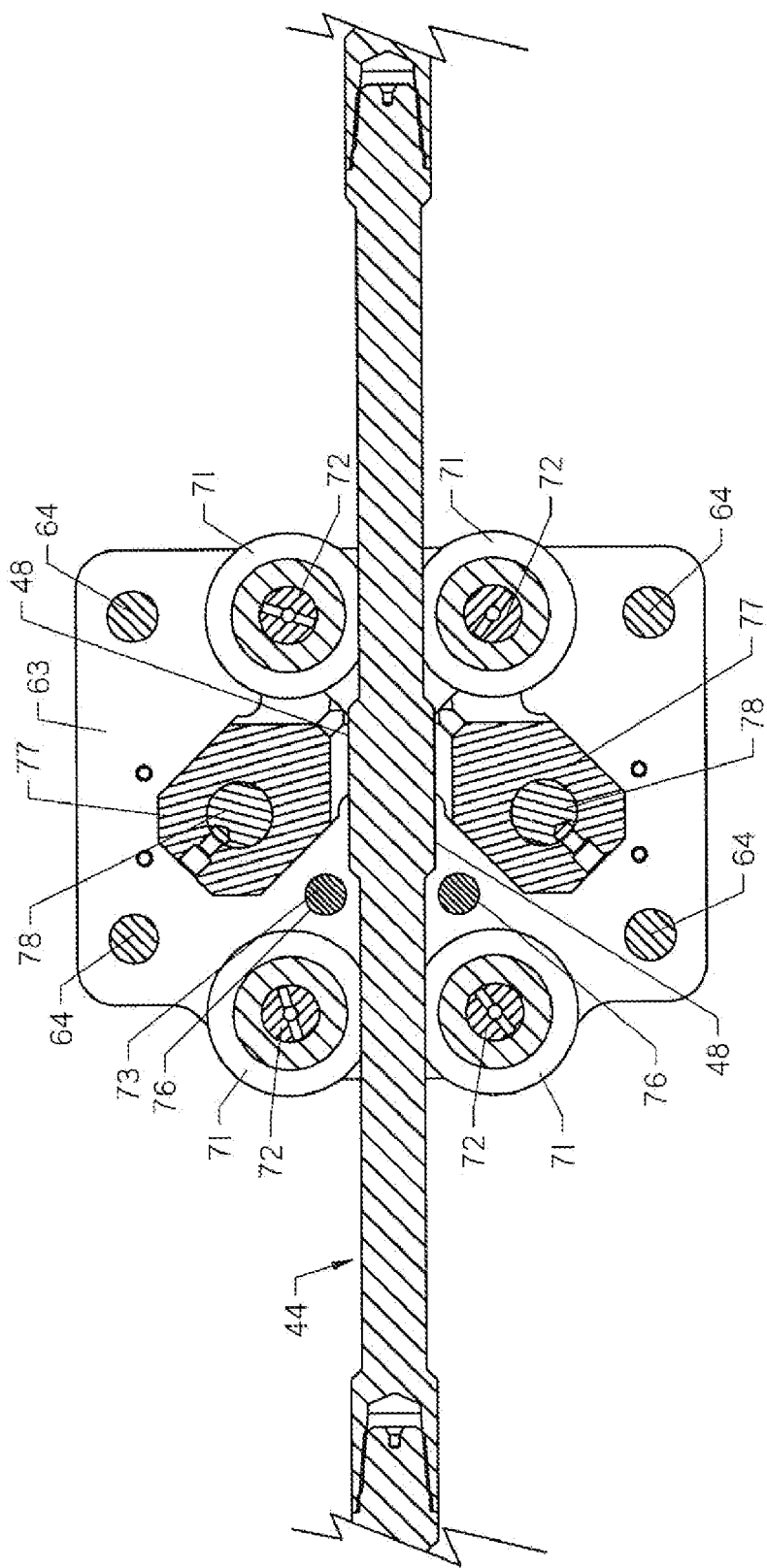
FIG. 6A is a lengthwise section of the ratchet block mechanism shown in FIG. 3 with the directional pins set for pullback.
Figure 6B:
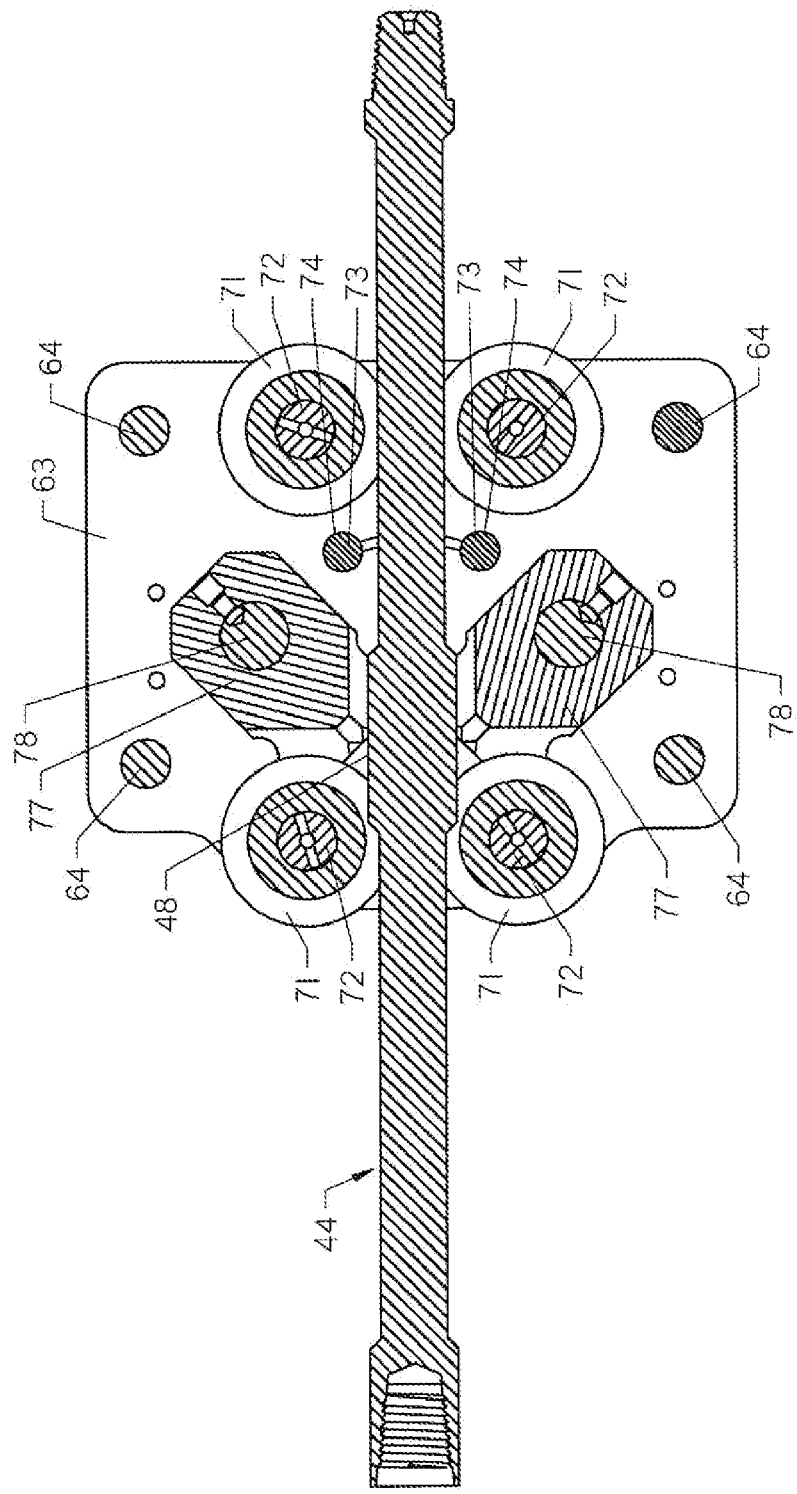
FIG. 6B is a lengthwise section of the ratchet block mechanism shown in FIG. 3 with the directional pins set for payout.
Figure 7:
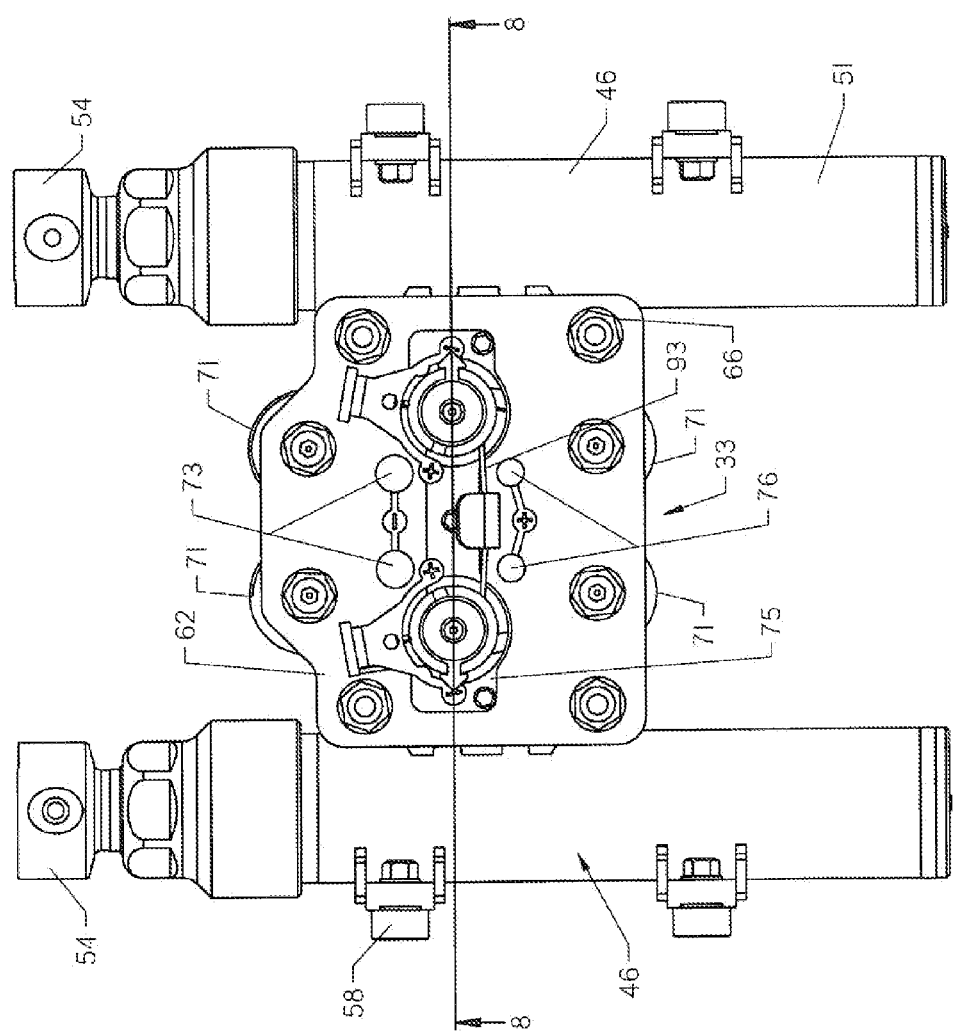
FIG. 7 is a top plan view of the ratchet block mechanism shown in FIG. 3 with the directional pins set for pullback.
Figure 8:
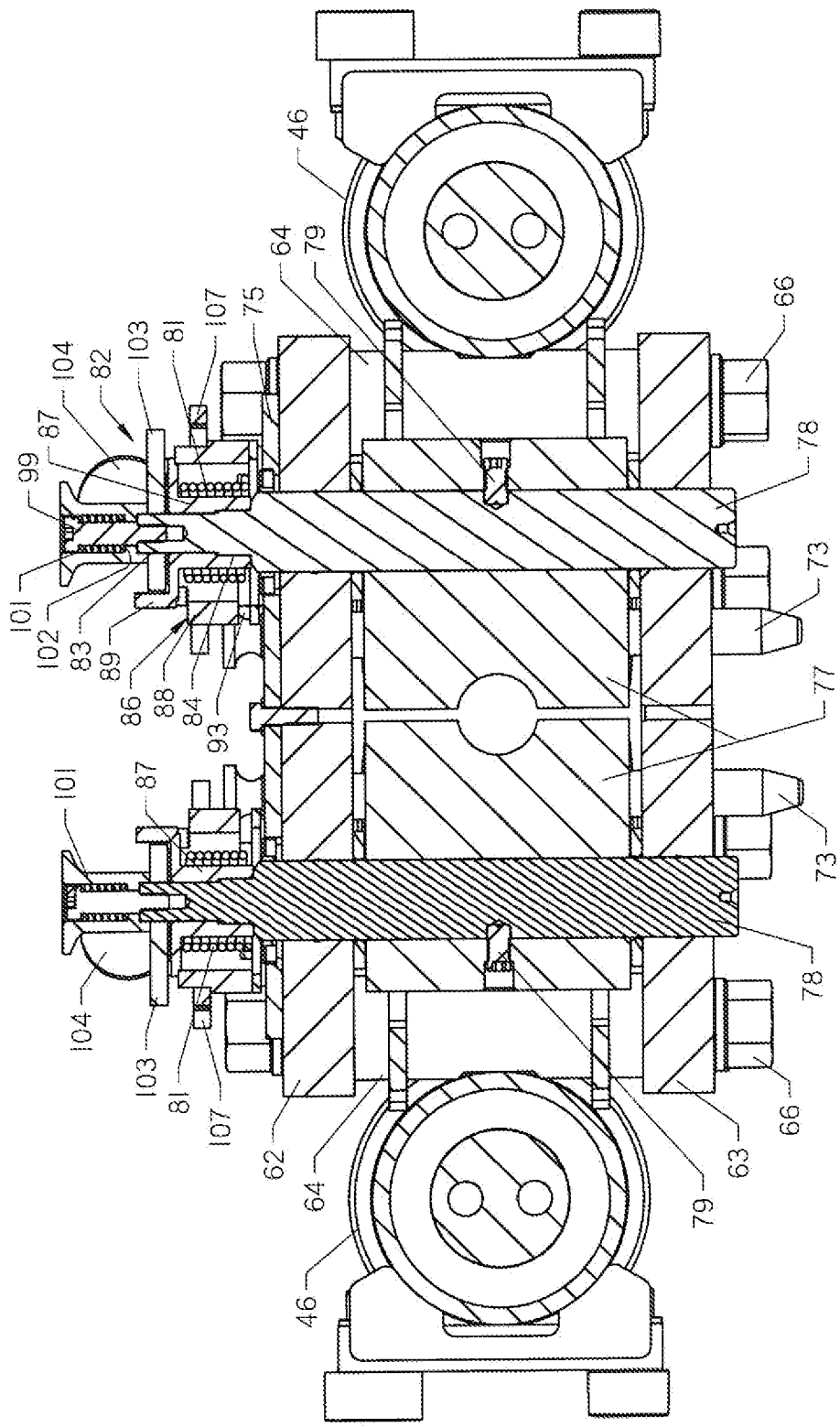
FIG. 8 is a cross sectional view taken along the line 8-8 in FIG. 7.

Referring to FIGS. 8 to 16, a pair of torsion springs 81 are mounted over shafts 78 and interact with a pair of preload assemblies 82 so that pawls 77 are normally closed and biased to abut against one set of direction pins 73 (dotted positions in FIG. 6B). In this position, when movement of ratchet block mechanism 33 by means of extension or retraction of cylinders 46 brings mechanism 33 up against a rod upset 48, pawls 77 engage the shoulder of the upset 48 and transmit the pushing or pulling force supplied by the cylinders 46 to move the rod string 44. For this purpose, shafts 78 each have reduced diameter upper end portions 83 formed with cutaway flats 84. A spring cup 86 includes a central sleeve 87, a downwardly opening outer cup portion 88, and an upwardly extending annular flange 89 having a pair of upwardly opening notches 91, 92 therein about 120 degrees apart (see FIG. 13). Inner sleeve 87 fits over end portion 83 and is free to rotate thereon. Torsion spring 81 is wound about the outside of sleeve 87 and has a upper leg 93 and lower leg 94 that extend tangentially therefrom at opposite ends. Each leg 93, 94 extends through an associated upper or lower circumferential travel slot 96, 97 in spring cup portion 88 near its upper and lower ends, respectively. Travel slots 96, 97 each extend about 120 degrees and are offset from each other in a circumferential direction by at least about 90 degrees.

A spool shaped knob 98 is mounted about a bolt 99 that is threadedly secured in the upper end of shaft 78. The inside of central through-hole 100 of knob 98 is configured to engage flats 84 so that knob 98 turns in unison with shaft 78. A coiled return spring 101 is confined between the underside of the head of bolt 99 and an upwardly facing shoulder 102 of knob 98, biasing knob 98 to its lowered position. A direction arrow 103 extends radially from the lower end of knob 98 and rests in one of notches 91, 92 when knob 98 is in its lowered position.

Figure 9:
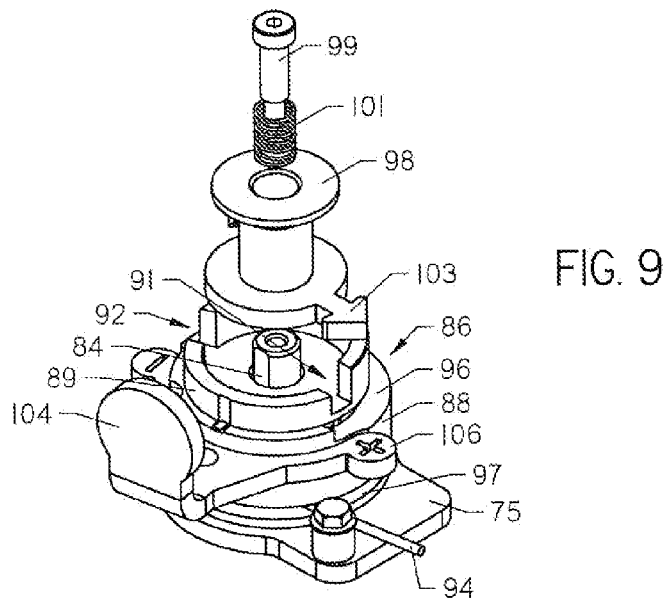
FIG. 9 is a partial, partly exploded view of a pawl biasing mechanism as shown in FIG. 3, in the payout position.
Figure 10:
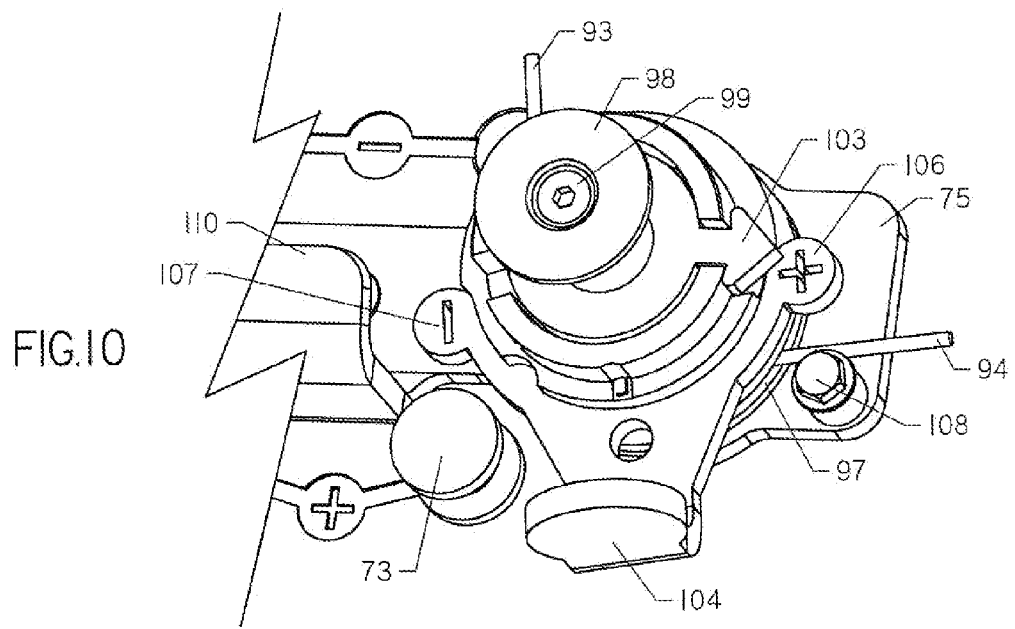
FIG. 10 is a top, partial perspective view of the pawl biasing mechanism shown in FIG. 9, in the payout position.

A handle 104 welded to the outside of cup portion 88 just below upper travel slot 96 includes (+) and (−) marker flanges 106, 107. Handle 104 and knob 98 are used to preload spring 81 and set the pawls 77 into the correct starting positions after a change of direction, as described hereafter. FIGS. 9 and 10 show the direction arrow 103 in slot 91 over the + flange 106, indicating the ratchet block assembly 33 is in position for payout or pushing of the rod string 44. The direction pins 73 are positioned in the front set of holes of holes 76 as shown in FIG. 6A. Each lower leg 94 of torsion spring 81 engages a corner bolt 108 that secures seal carrier 75 to upper plate 62. Prior to preloading of spring 81, upper leg 93 extends tangentially at about 120 degrees relative to lower leg 94 and is in engagement with one end of its travel slot 97. In this position, the force of spring 81 causes lower leg 94 to push against an external stop (bolt 108) and upper leg 93 to push against spring cup 86 at the end of travel slot 96. This biases spring cup 86 towards rotation in the same direction as leg 93 is pushing. In the position shown in FIG. 10, leg 93 and cup 86 are biased in a counterclockwise direction on the right side as shown, and in a clockwise direction on the other (left) side. This force is transmitted through to pawls 77 due to the engagement between direction arrow 103 and the notch 91 of spring cup 86.

The process of setting ratchet block mechanism 33 for a change of direction is as follows. The user pulls up on knob 98 and holds it up, releasing direction arrow 103 from the notch 91 (or 92). This releases shaft 78 from the force of spring 81 and causes spring cup 86 and its associated handle 104 to rotate over a short arc as spring 81 unwinds. The user pulls pins 73 from their holes 74 or 76 and moves them to the other pair of holes 74 or 76. While holding knob 98 up, the user rotates handle 104 (counterclockwise in the example shown in FIGS. 15A, 15B) so that the other notch 91 or 92 lines up with direction arrow 103. Knob 98 is then lowered into the notch. These steps are repeated on the other side in the same manner except that rotation of handle 104 is in the opposite direction.

Figure 11:
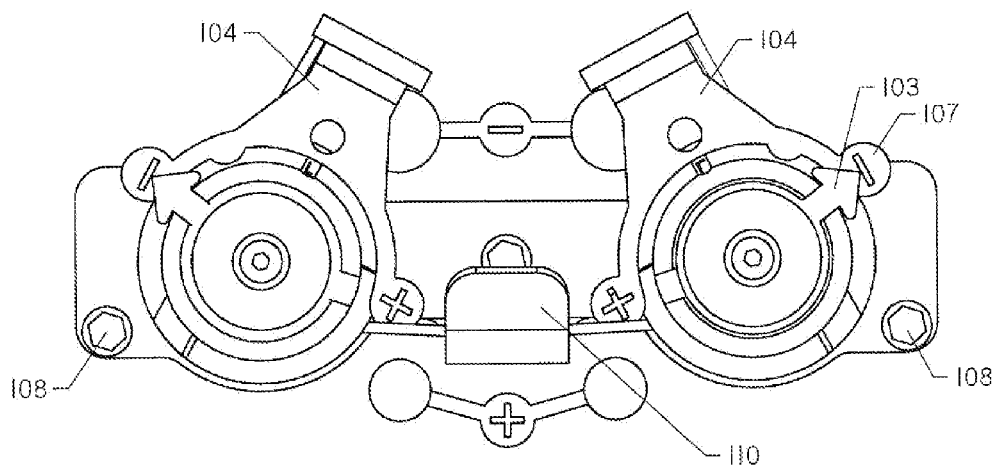
FIG. 11 is a top perspective view of the pawl biasing mechanism shown in FIG. 3, in the pullback position.
Figure 12:
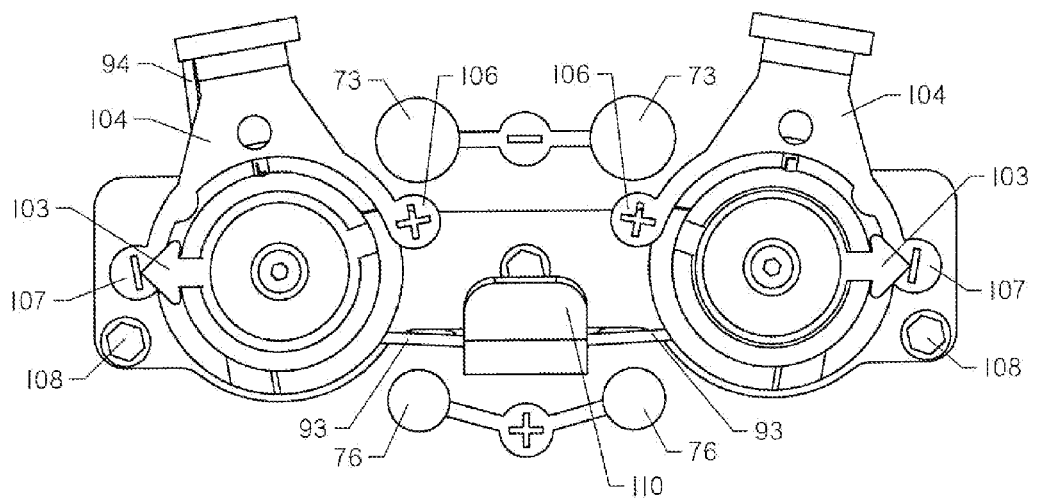
FIG. 12 is the same view as FIG. 11, following rotation of the pawl shafts.
Figure 13:
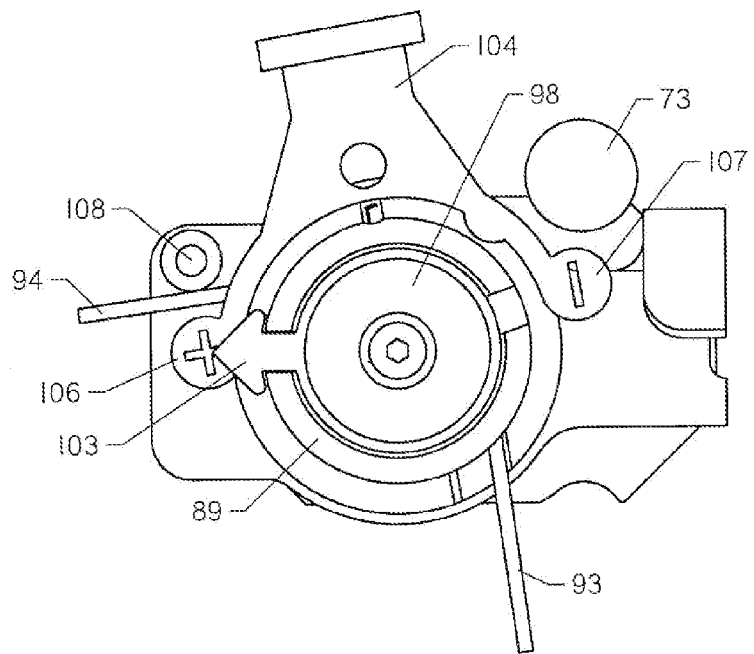
FIG. 13 is an enlarged, partial top view of the right pawl biasing mechanism shown in FIG. 11.
Figure 14:
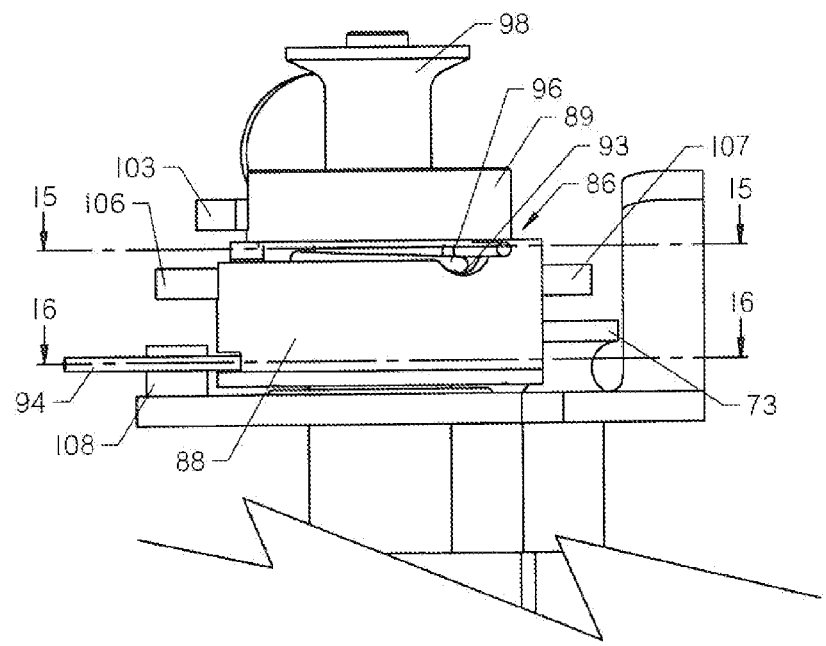
FIG. 14 is a partial side view of the biasing mechanism of FIG. 13.
Figure 15A:
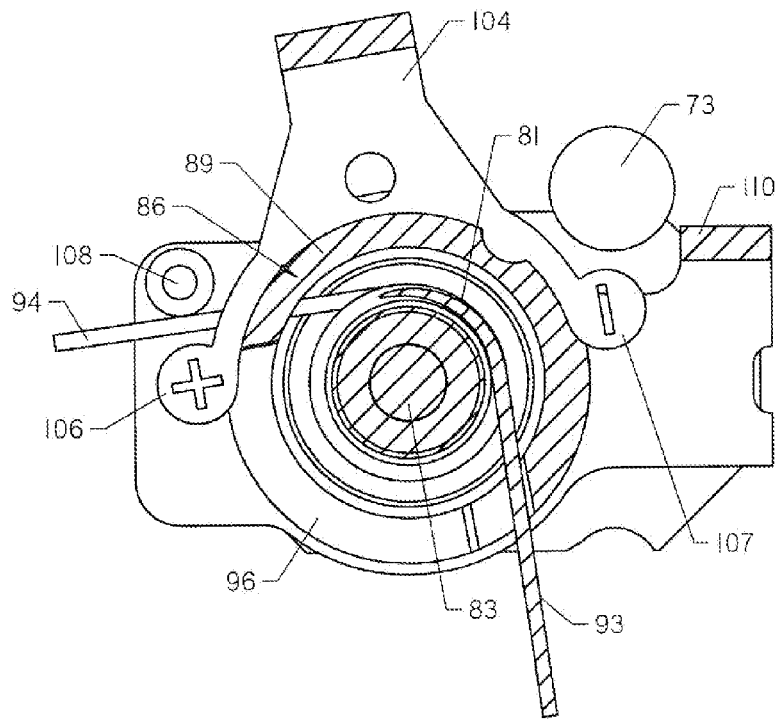
FIG. 15A is a cross-section taken along the line 15-15 in FIG. 14.
Figure 16:
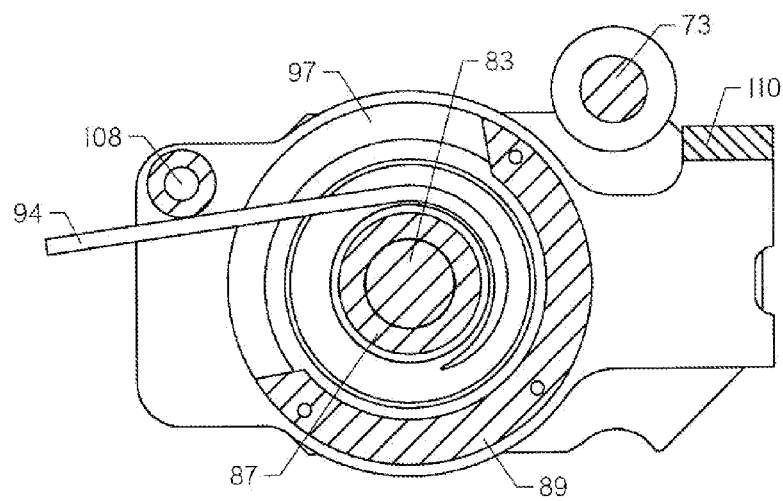
FIG. 16 is a cross-section taken along the line 16-16 in FIG. 14.
Figure 15B:
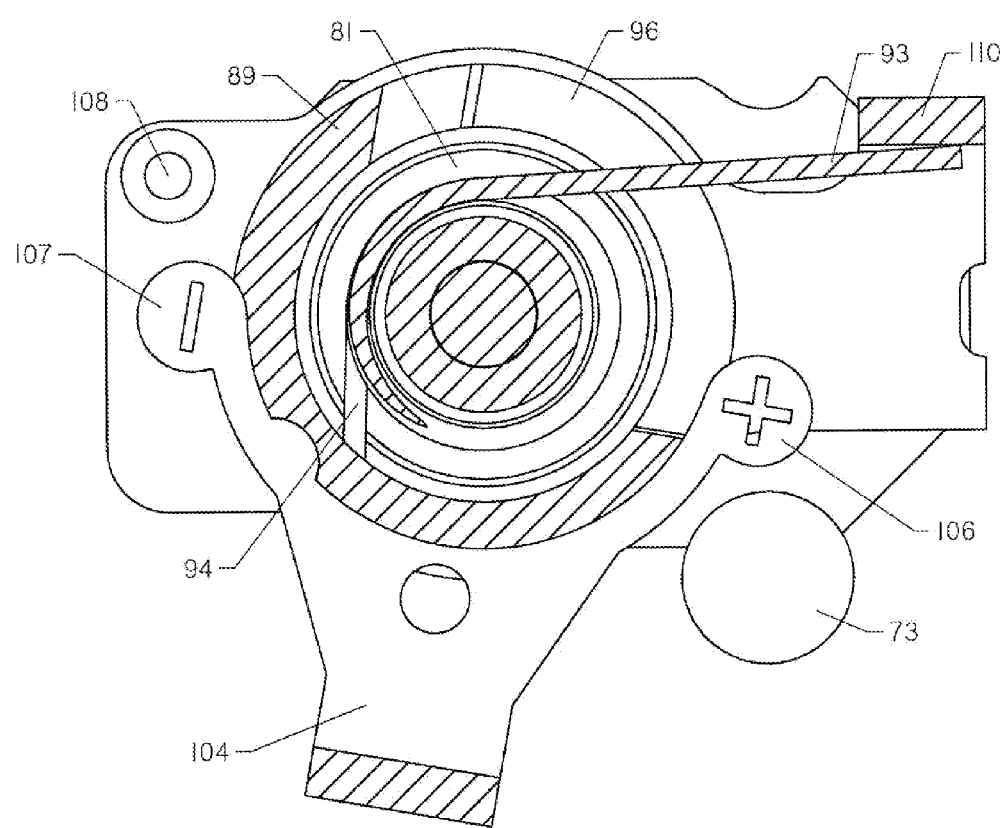
FIG. 15B is the same view as FIG. 15A, with the mechanism shifted to the minus (−) position.
Figure 17:
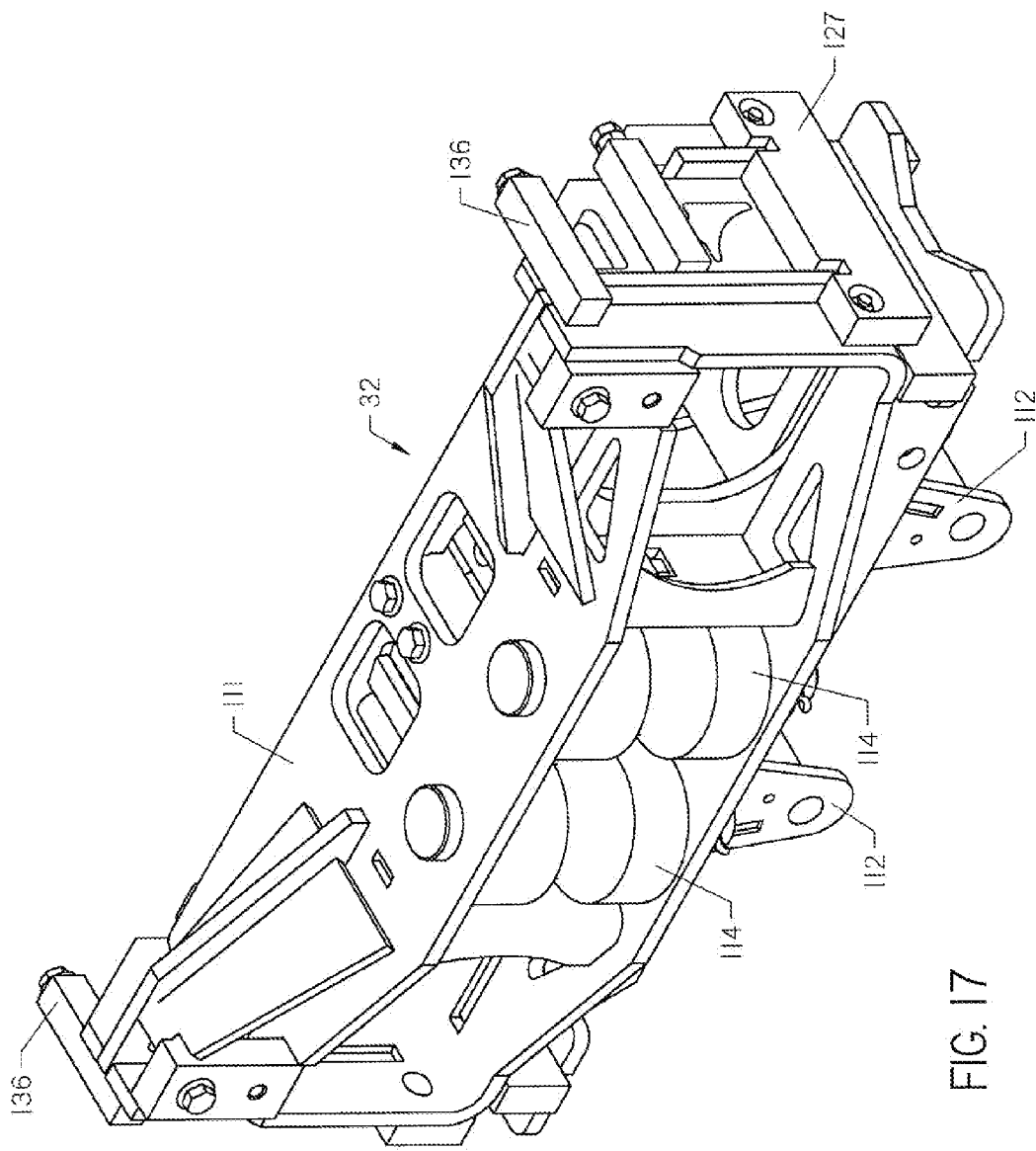
FIG. 17 is a front perspective view of a bungee vise according to the invention.
Figure 18:
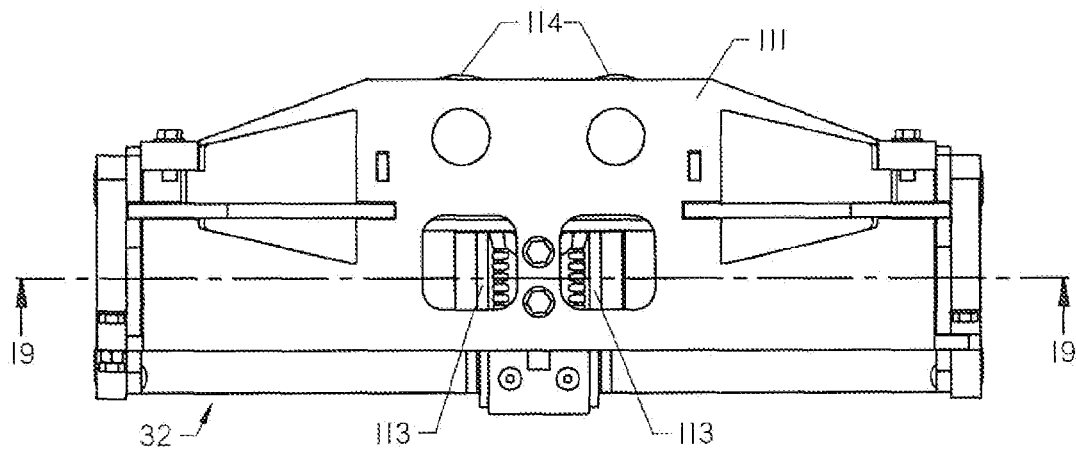
FIG. 18 is a top view of the bungee vise of FIG. 17.

In FIGS. 9, 10, and 13-16, showing the arrow 103 in the payout (+) position in notch 91, lower leg 94 of spring 81 abuts against stop 108 and upper leg 93 abuts against the end of travel slot 96. As handle 104 is shifted so that arrow 103 rests in notch 92 as shown in FIGS. 11-12, spring cup 86 pivots relative to spring 81. During this process, leg 94 comes into engagement with the end of travel slot 97 (moving counterclockwise from the position shown in FIG. 12) and moves off of stop 108. As leg 94 continues to move, leg 93 moves with it until leg 93 encounters its corresponding stop 110. FIG. 15A shows the movement of handle 104 and legs 93, 94 at the start of this process, and FIG. 15B shows the position at the end. The biasing effect of spring 81 has reversed direction.

As ratchet block assembly 33 is moved back along the length of a stationary rod string 44 by extension of cylinders 46, pawls 77 encounter an upset 48 and pivot to allow upset 48 to pass by, then return to abut against pins 73. FIG. 12 shows the position of the mechanism 33 in its nominal (undeflected) position when in (−) pullback mode. As cylinders 46 retract, pulling ratchet block mechanism 33 forward for another stroke, pawls 77 deflect rearwardly when they encounter an upset 48. Handles 104 pivot to the positions shown in FIG. 11, further winding spring 81. When upset 48 has passed by, the force of spring 81 returns pawls 77 to the position of FIG. 12 wherein they are biased against pins 73. Once the pullback stroke begins and pawls 77 encounter an upset 48, pins 73 prevent pawls 77 from swinging open to allow the upset 48 to pass by, and instead engage it so that the full pulling force of cylinders 46 acts on the rod string and pulls it back. The cyclic pulling steps generally continue until the last rod having the tooling attached thereto passes through the front end hole 14.

Payout using ratchet block mechanism 33 proceeds in the same way but with the direction of each step reversed. After cylinders 46 are fully extended, they are then retracted. Pawls 77 are biased into engagement with the rear shoulders of the first upset 48 they encounter, whereupon drill string 44 is held and pushed forward by the forward movement of ratchet block assembly 33. The process of extending and retracting cylinders 46 continues cyclically until the rod string 44 has advanced a sufficient distance.

During payout, rods are added to the rod string between cycles, and during pullback, rods are removed between cycles. For this purpose, to prevent undesired axial movement of drill string 44 during rod coupling and decoupling operations, a bungee vise 32 is provided to grip the second to last rod in the string at appropriate times in the cycle. In the case of pullback, this would be as ratchet block mechanism 33 approaches its rearwardmost position. Jaws of vise 32 engage rod string 44 in front of an upset 48 (see FIG. 31), and then ratchet block mechanism 33 is cycled forward for the next pull. Spinner 31 then engages the rearmost rod 49 and decouples it by means of one or more motor driven tangential spinning cylinders while vise 32 holds the adjacent rod 49 and prevents it from rotating. Once the endmost rod 49 is decoupled, the operator removes it and places it in the rod box 20. The next cycle then begins.

It is strongly preferred according to the invention that the bungee vise grip the rod string next to a shoulder of an upset, such that if the jaws slip on the minor diameter portion of the rod, the radial shoulder will prevent the rod string from slipping through the vise. In practice, the pulling force of the machine will exceed the ability of the vise jaws to hold the rod string by gripping force alone. For example, machine 10 of this embodiment is designed to pull with 80 tons of force, but bungee vise 32 can hold at most about 22 tons without slipping along the minor diameter of the rod string, as it would if upsets 48 were not present.

For payout, the cycle is similar. As ratchet block mechanism 33 approaches its forwardmost position, jaws of vise 32 engage rod string 44 at a location on the minor rod diameter behind the next upset 48 (see FIG. 32), and then ratchet block mechanism 33 is cycled rearward for the next push. The operator places a rod from box 20 into position on spinner 31, and then threads it into the endmost rod of string 44 using the spinner 31. Once the new rod has been added to the string 44, vise 32 releases the string 44 and the next push cycle then begins.

In testing it was learned that releasing a stationary bungee vise during pullback with a significant load applied allows the rod string 44 to accelerate toward the pipeline. This results in an impact when an upset 48 reaches the ratchet block pawls 77, a distance of typically 2 inches. Repeated impacts of this kind damages the ratchet block mechanism. Accordingly, a need was identified to permit bungee vise 32 to move over a limited distance and time the release of bungee vise 32 with the engagement of pawls 77 on a rod 49 during pullback, preferably once such engagement has taken up all or significant part of the load on the rod string 44. This problem is not significant in payout mode, and for that reason the hydraulic logic described hereafter is one-sided, operating only during pullback.

Referring to FIGS. 17-22, bungee vise 32 includes a vise frame 111 and vise arms 112 that clamp a pair of vise jaws 113 against a rod 49 of rod string 44. When clamped onto a rod 49 of drill string 44, vise 32 secures the axial and torsional position of the drill string when the drill string is not engaged by ratchet block mechanism 33. A pair of vertical guide rollers 114 mounted at the front of frame 111 serve to guide a rod 49 into bungee vise 32 and constrain the rod from excessive lateral or vertical movement. Vise frame 111 has a central slot 116 through which a rod is inserted between vise jaws 113. A hydraulic cylinder 117 is connected by pivots to the lower ends of vise arms 112 to clamp jaws 113 onto a rod 49 inserted in the vise. A pair of pins 120 extend through midportions of arms 112. Arms 112 pivot about pins 120 when cylinder 117 is actuated.

Figure 19:
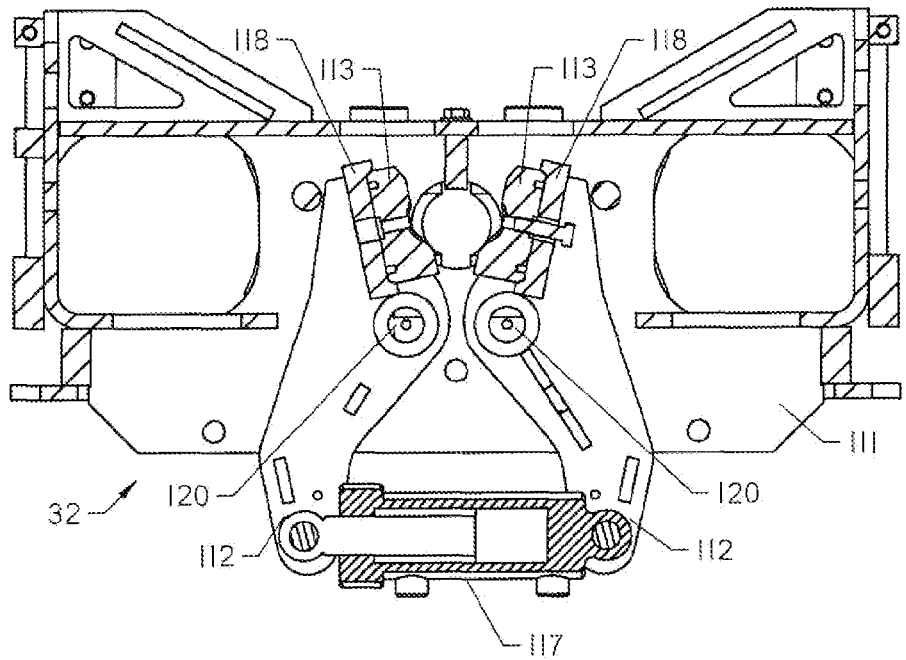
FIG. 19 is a cross-section taken along the line 19-19 in FIG. 18.
Figure 20:
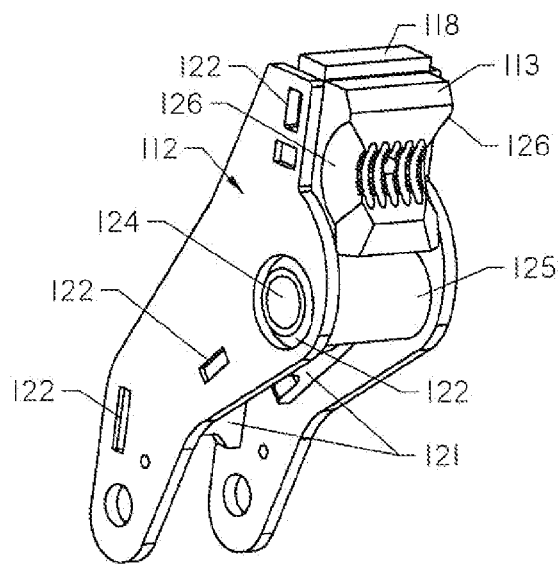
FIG. 20 is a perspective view of a vise arm shown in FIG. 19.
Figure 21:
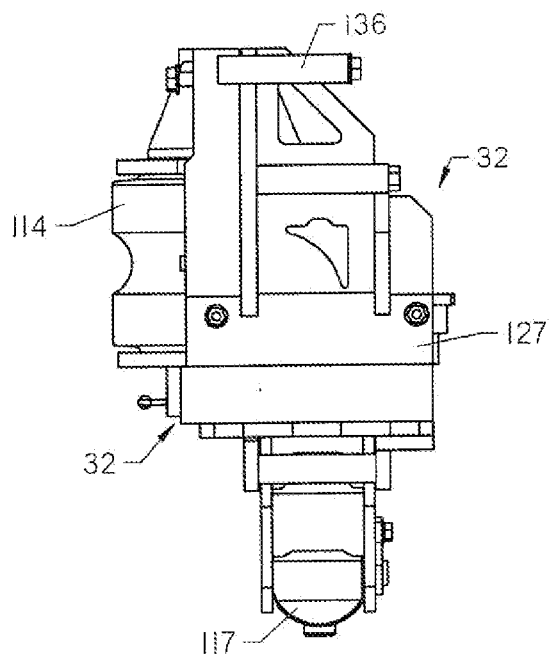
FIG. 21 is a side view of the bungee vise of FIG. 17.
Figure 23:
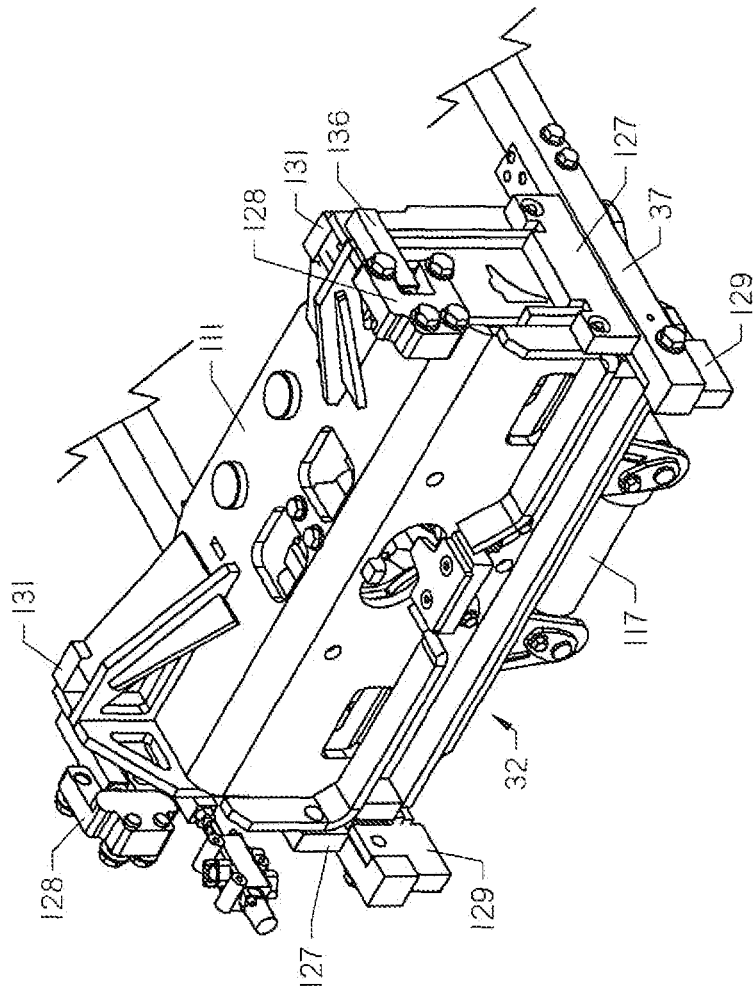
FIG. 23 is a rear perspective view of the bungee vise of FIG. 22, including rails and stops.
Figure 22:
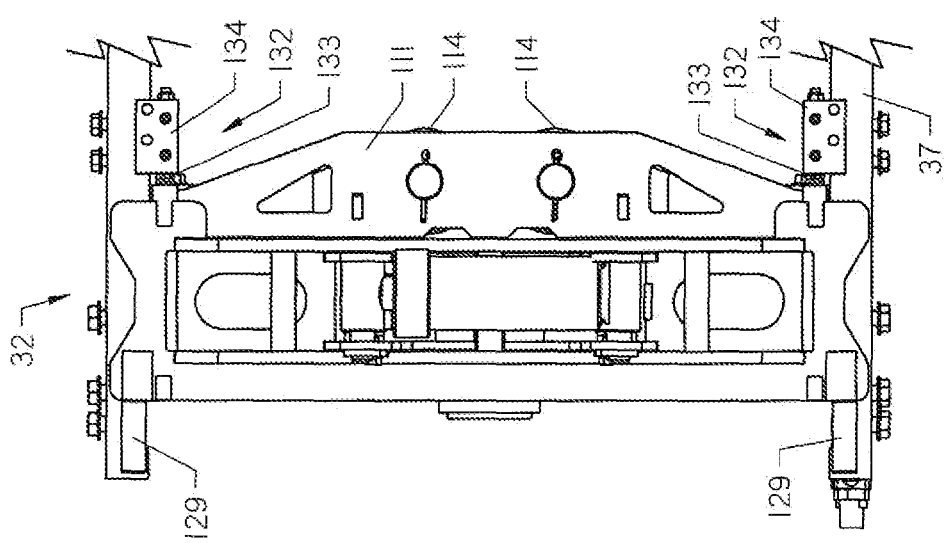
FIG. 22 is a bottom view the bungee vise of FIG. 17, showing rails and stops mounted on the hull with the walls of the hull omitted.
Figure 24:
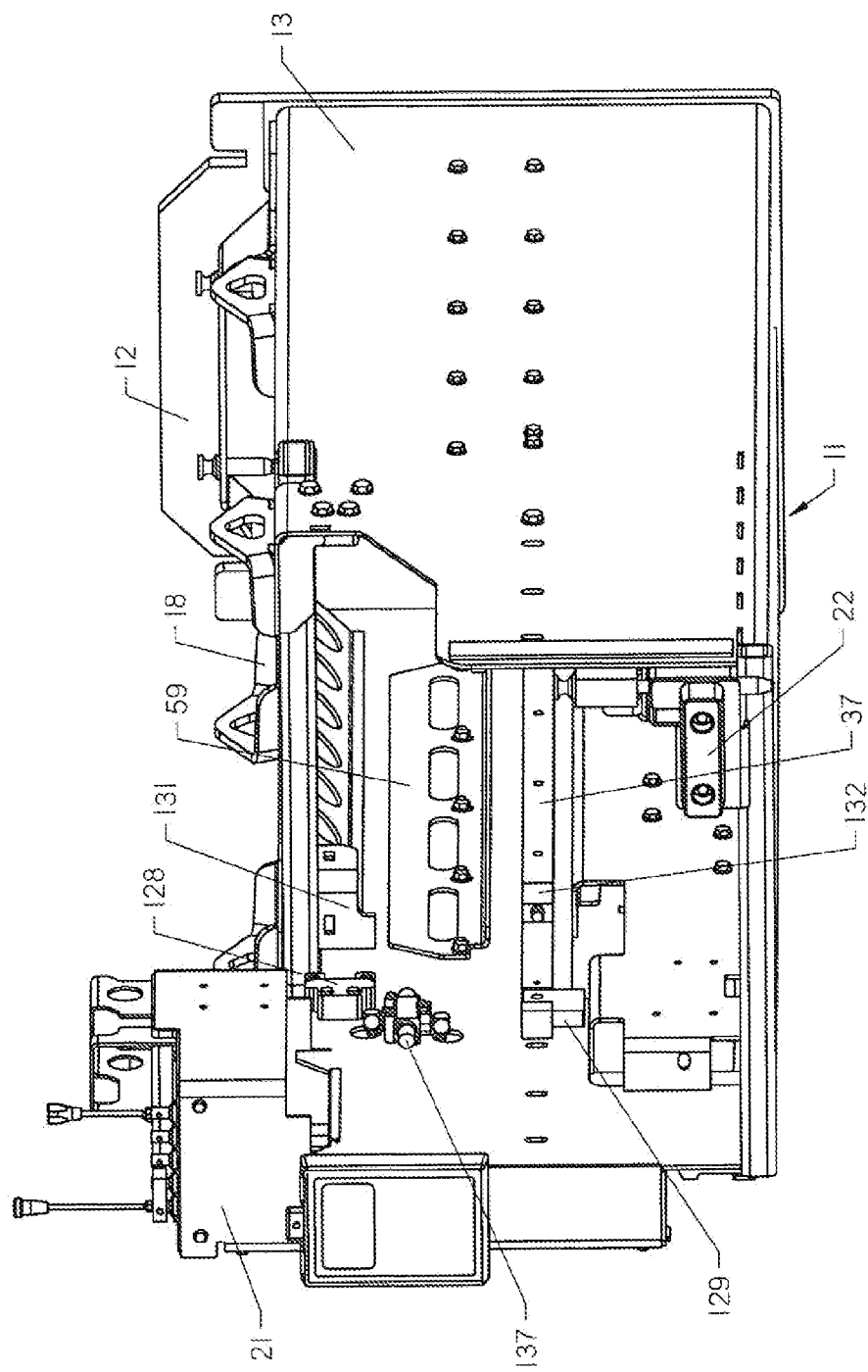
FIG. 24 is a rear perspective view of the hull of FIG. 1, with the ratchet block, bungee vise and spinner removed.
Figure 25:
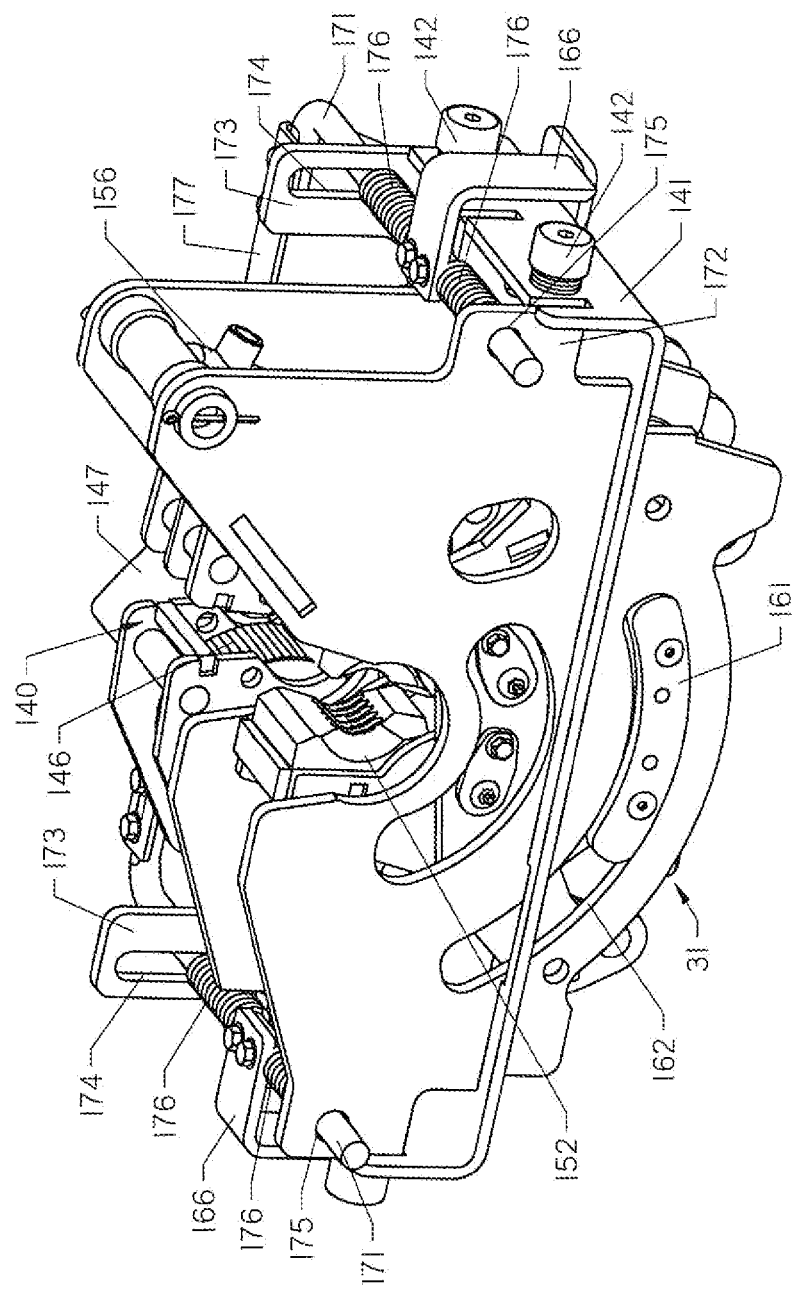
FIG. 25 is a front perspective view of a spinner according to the invention.
Figure 26:
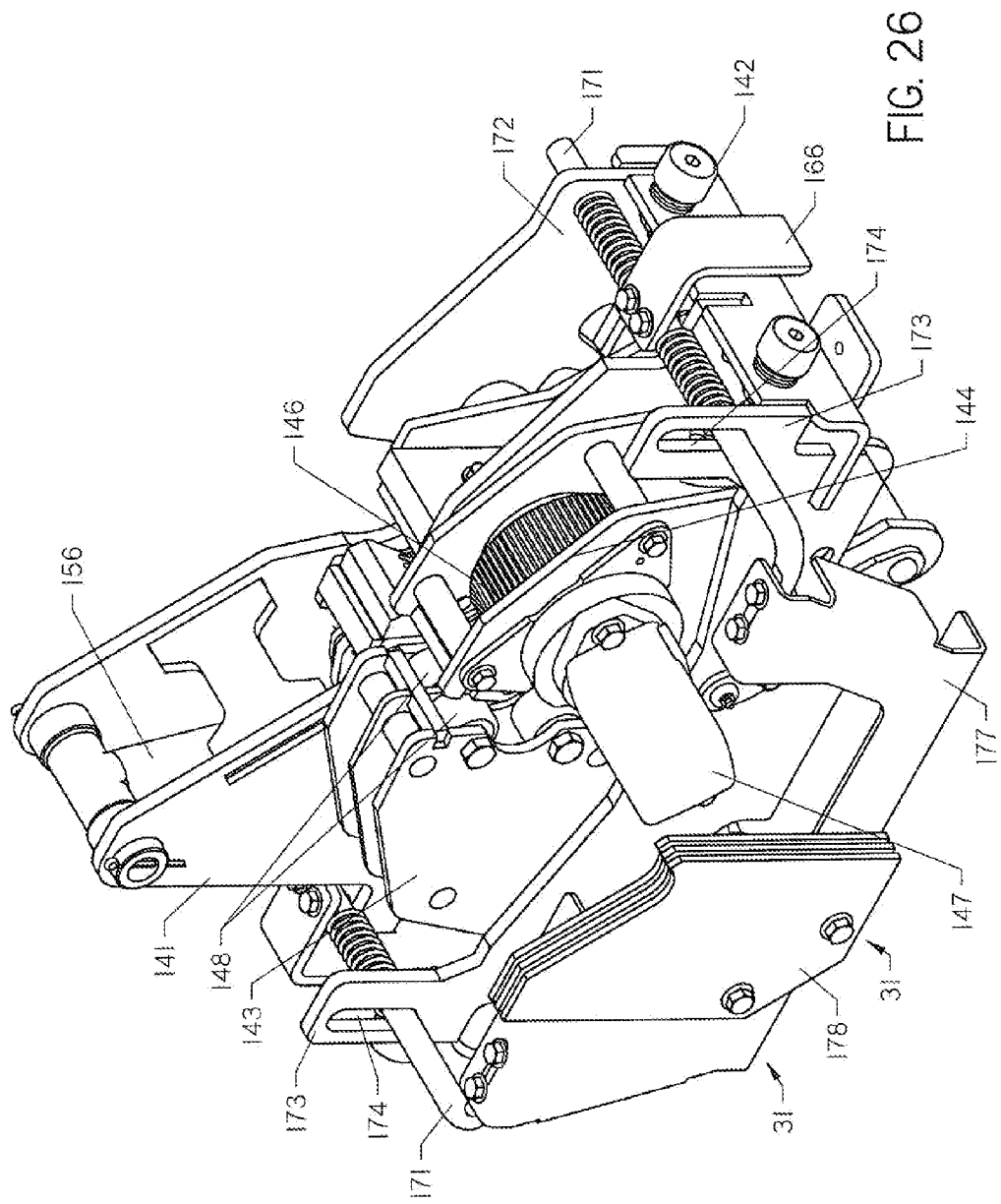
FIG. 26 is a rear perspective view of the spinner of FIG. 25, with springs omitted.
Figure 27:
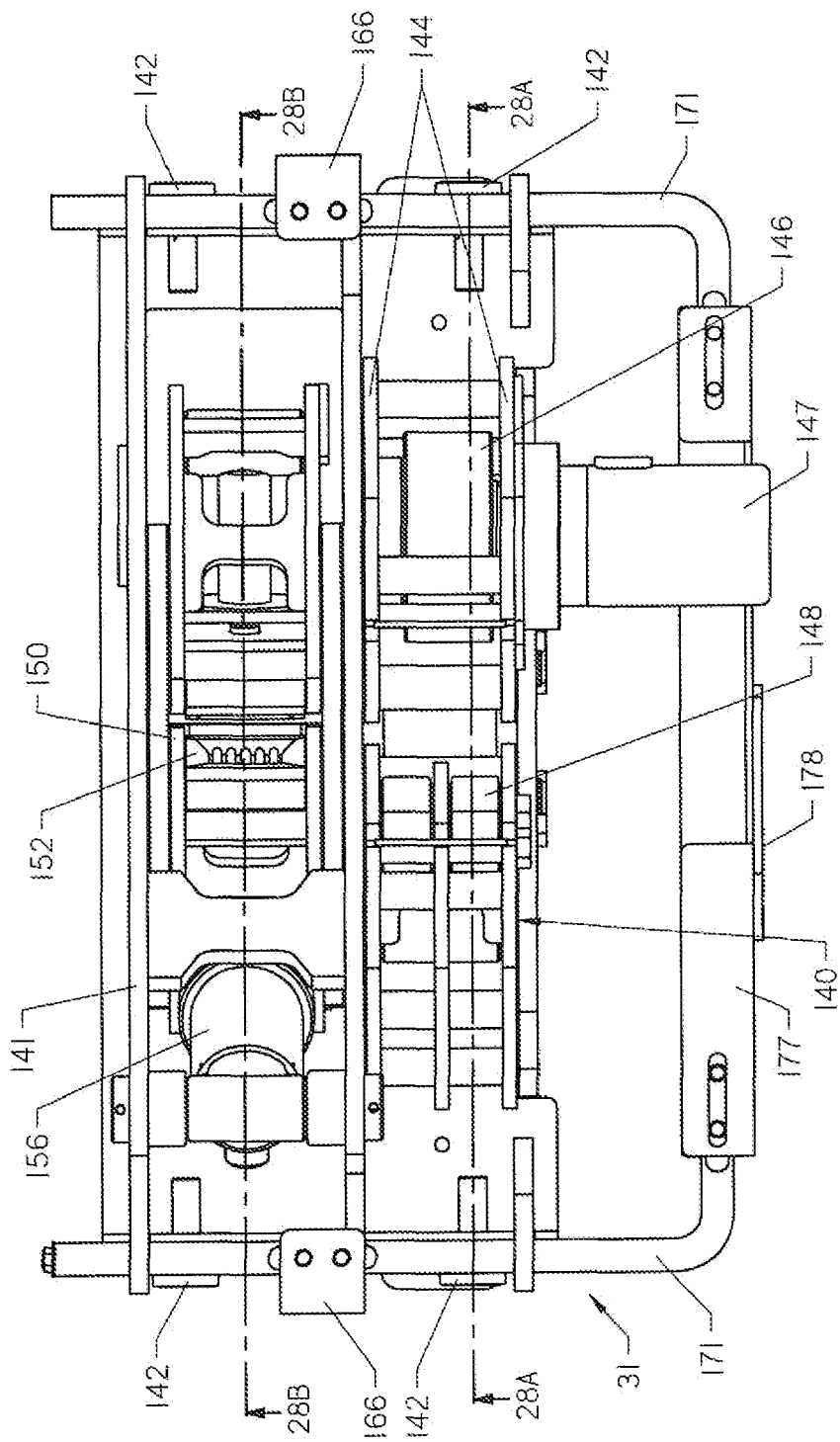
FIG. 27 is a top view of the spinner of FIG. 25, with springs omitted.
Figure 28A:
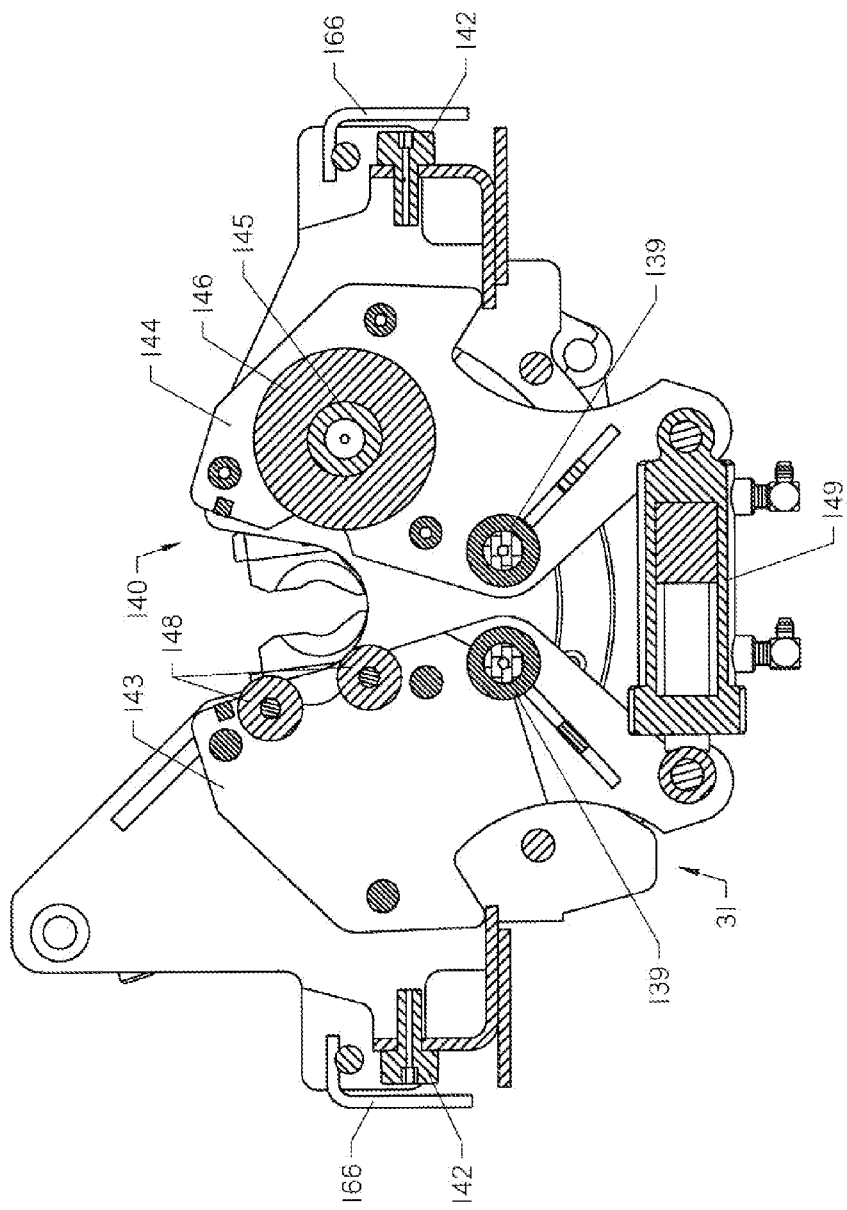
FIG. 28A is a cross-section taken along the line 28-28 in FIG. 27, shown in an open position.
Figure 28B:
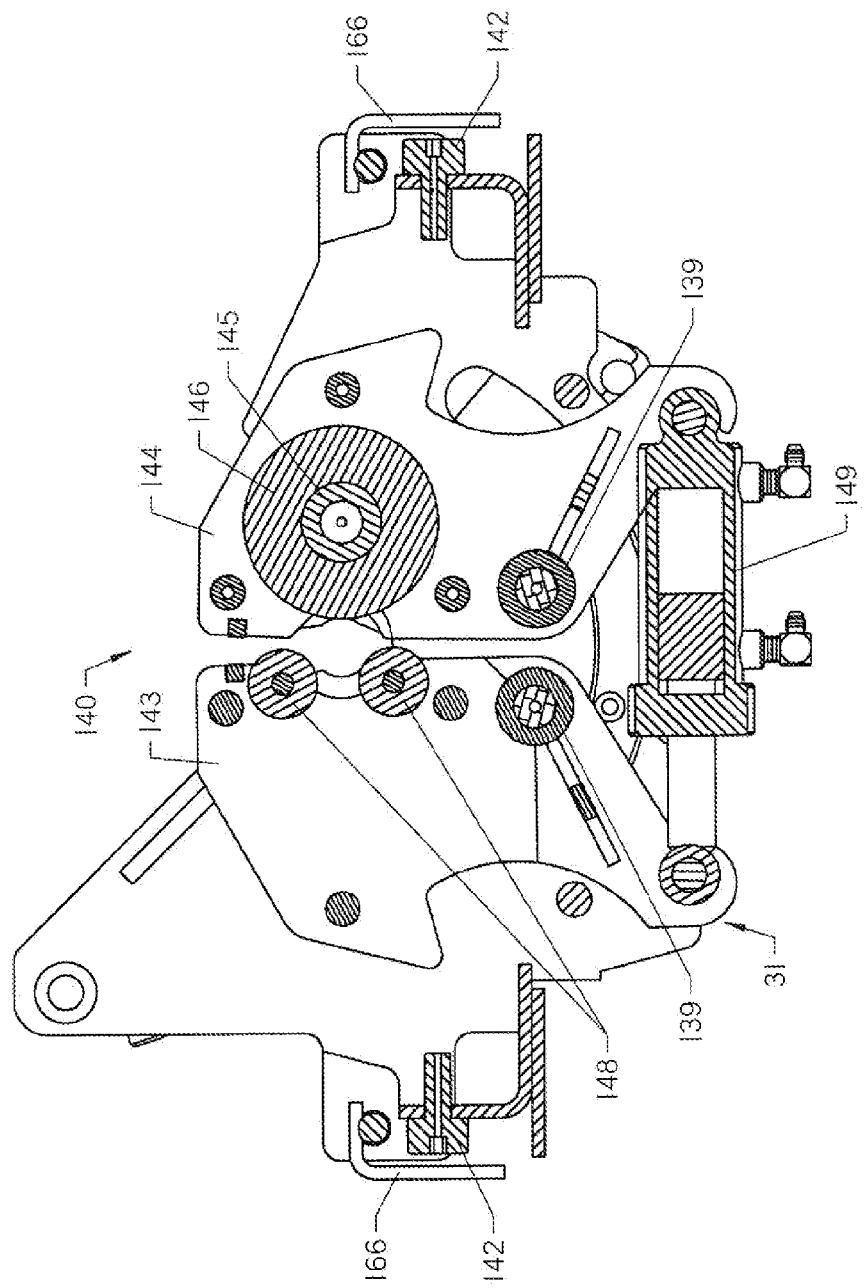
FIG. 28B is a cross-section taken along the line 28-28 in FIG. 27, shown in a closed position.

As shown in FIGS. 19-20, vise jaws 113 are in the form of removable jaw blocks are bolted into a pair of cup-shaped holders 118. A pair of symmetrical side plates 119 of each vise arm 112 are welded to holder 118 and other connectors 121 at plug weld locations 122. Cylinder 117 mounts to vise arms 112 at pin holes 123. Through hole 124 of a tubular bearing 125 houses the pivot 120 about which each vise arm 112 rotates to actuate the clamping operation. Jaws 113 each have a conical shoulder 126 designed to fit securely against the adjoining rod upset 48, providing redundant restraint should the grip force of vise 113 not be able to hold drill string 44 against the axial force induced by the product pipe.

Both spinner 31 and bungee vise 32 are located on guide tracks or rails 37. Rails 37 keep the two systems aligned and make it possible for them move back and forth. For this purpose, frame 111 has a pair of plastic slide bars 127 mounted on opposite sides thereof which support vise 32 for sliding movement along rails 37. Travel of vise 32 is limited to about one half inch (0.5") along rails 37 by sets of reaction stops including rear, upper and lower stop blocks 128, 129 bolted to the inside of hull 11, front upper stop blocks 131 likewise bolted to the inside of hull 11, and a pair of spring stops 132 located at the lower front corners of vise 32. Spring stops 132 each comprise a compression spring 133 set in a rearwardly opening pocket 134 so that the rear end of spring 133 engages a facing surface of frame 111 of vise 32. Rear upper stops 128 are horseshoe-shaped and face forwardly for engagement with rearwardly extending bars 136 on frame 111. When there is no load applied to the bungee vise 32 by the rod string, the vise 32 will be thrust rearwardly by spring stops 132. When the bungee load on the rod string 44 is pulling the clamped vise forward with greater than 580 lb, the force of springs 133 is overcome and the vise 32 moves forward until its front face engages front stops 131.

A hydraulic switch 137 mounted on hull 11 just behind vise 32 will be opened when vise 32 is displaced from its normal aft position. This action indicates to the hydraulic system logic that there is more than 580 lb of forward bungee force present. In that case, the logic does not open the bungee vise 32 to release the rod string 44. The clamp force from jaws 113 remains applied until the ratchet block pawls 77 engage a rod upset 48 and begin moving the rod string 44 to the rear. When switch 137 is closed, the vise 32 is permitted to release the rod string 44, as at this point load has been taken up by the ratchet block mechanism 33. It should be noted that, due to the position of the springs and switch, this system operates only in pullback mode, not payout mode. This is so because it was found damage to the ratchet mechanism as discussed above mainly occurs during pulling not pushing operations.

Referring to FIGS. 25-30, spinner 31 threads and unthreads rods 49 as well as providing a positive means to make (tighten) and break threaded joints in coordinated action with the bungee vise 32. Spinner 31 has a large, generally rectangular welded frame 141 with pairs of steel wheels 142 mounted on opposite sides so that spinner 31 can slide within hull 11 along rails 37. A rod spinning assembly 140 includes an idler arm 143 and a drive arm 144 are mounted in opposing positions on the rear side of frame 141. These arms 143, 144, shown in the open position in FIG. 28A, rotate a rod 49 to thread up or unthread the rod to or from the rod string 44. Rotation is accomplished by rotating a drive wheel 146 mounted on the upper end of arm 144 with a hydraulic motor 147 while two pairs of upper and lower idler rollers 148 mounted on the upper end of arm 143 engage the rod on the other side. Drive wheel 146 is mounted on a shaft 145. Shaft 145 is rotationally keyed to hydraulic motor 147 such that wheel 146 spins when the motor 147 is actuated. Motor 147 may be actuated in either direction as needed to thread up or thread off the rod. Spinner arms 143, 144 are mounted on central pivots 139 in a manner similar to the arms used in vise 32, and a cylinder 149 pivotally mounted at lower ends of arms 143, 144 clamps and unclamps arms 143, 144 as needed during the cycle. Once cylinder 149 has been extended, drive wheel 146 can rotate the rod 49 at low torque levels.

A pivoting vise 150 that induces torque on a rod is mounted on frame 141 just in front of the spinning assembly 140. It grips the rod 49 tightly with aggressive serrated jaws 152. Jaws 152 are mounted at the upper ends of symmetrically positioned torque arms 153. Once jaws 152 are clamped on a rod 49, the assembly of torque arms 153 and a torque frame 154 is rotated through about 30 degrees about the rod centerline by extension or retraction of a cylinder 156 connected to one end of frame 154. This action, depending on whether clockwise or counterclockwise, will make or break the thread joint. However, as a practical matter the torque vise is only needed for breaking the joint; the spinning mechanism operating alone can thread in a new rod. Arms 153 are each mounted for rotation on a pair of central pins 157 set in frame 154. A second hydraulic cylinder 158 pivotally mounted at the lower ends of arms 153 is operated to open and close jaws 152.

Figure 29A:
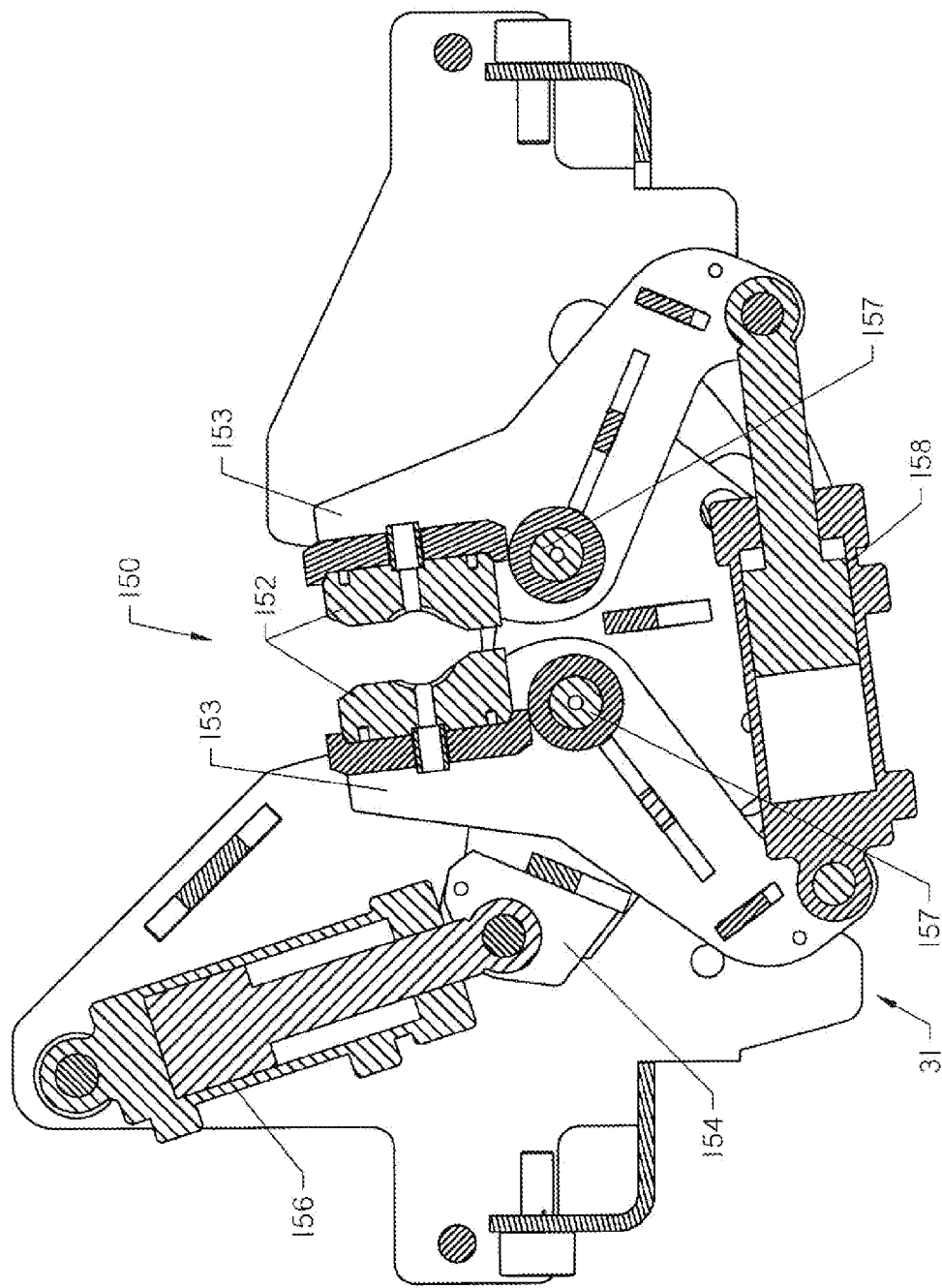
FIG. 29A is a cross-section taken along the line 29-29 in FIG. 27, shown in an untilted position.
Figure 29B:
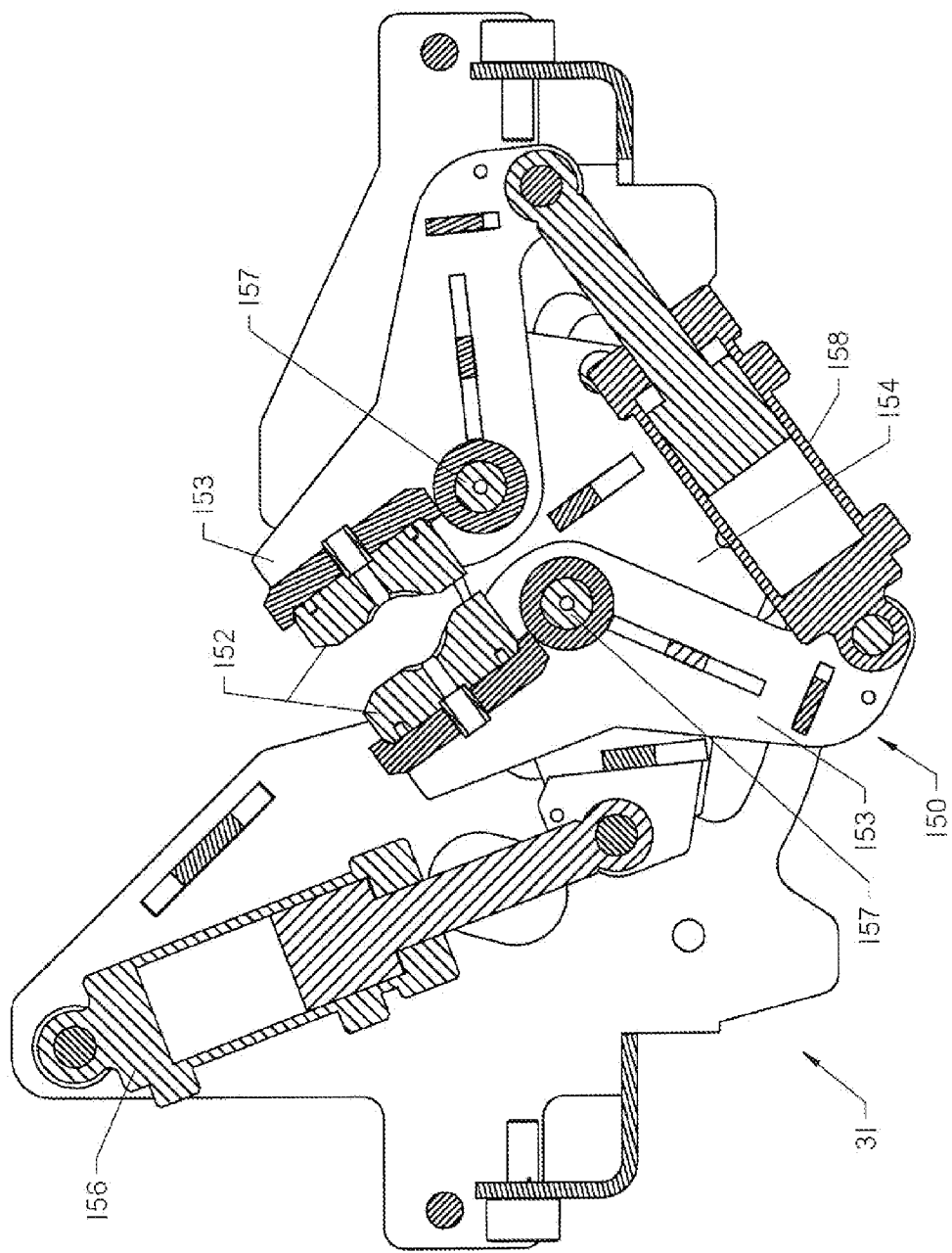
FIG. 29B is a cross-section taken along the line 29-29 in FIG. 27, shown in a tilted position.
Figure 30:
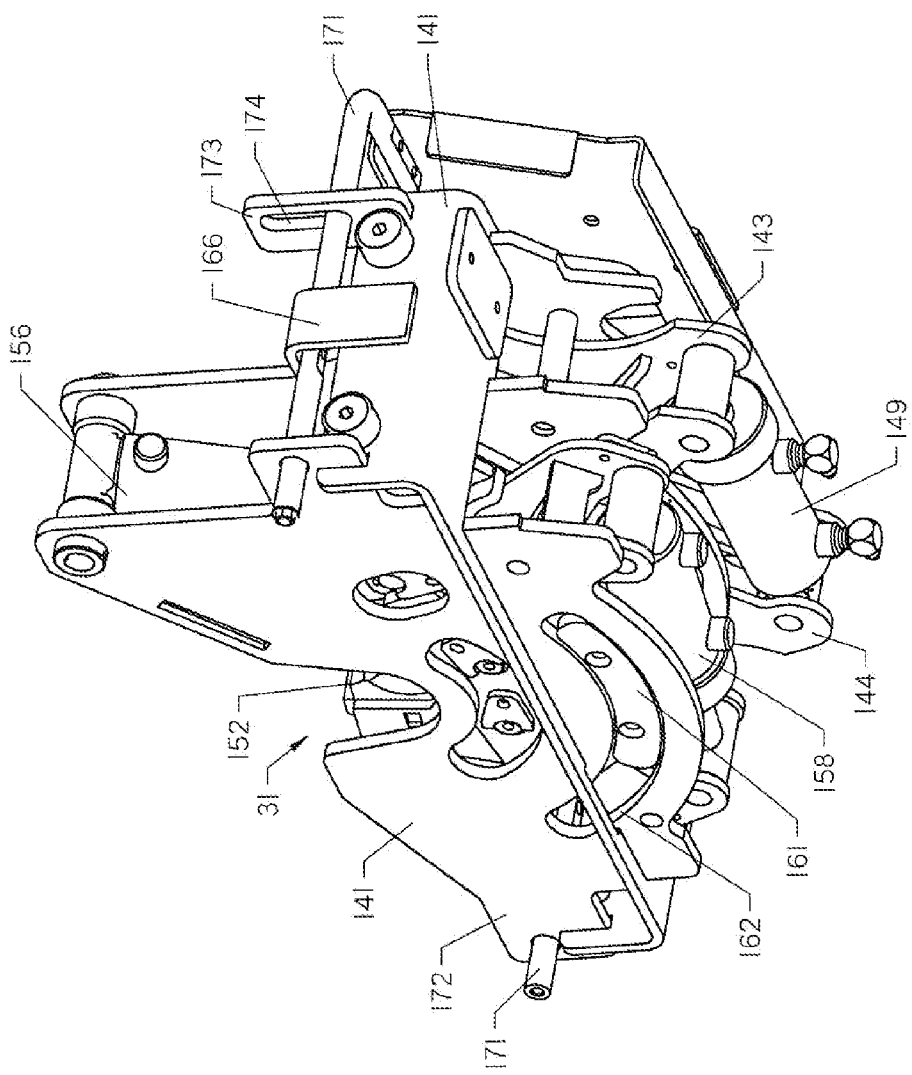
FIG. 30 is a front perspective view of a spinner according to the invention, showing its underside, with springs omitted.

In FIG. 29A, torque arms 153 are shown in a position that would be closed on the rod (rod not shown). Cylinder 158 has been extended to achieve this clamping action. Cylinder 156 has not been extended. As this view is from the rear of the machine, the process is in the midst of breaking (loosening) a rod joint. FIG. 29B shows the same assembly with cylinder 156 extended. As cylinder 156 extends, a bearing 161 on vise frame 154 is travels in a curved slot 162 in spinner frame 141, which guides the movement of vise 151. When a rod is present, the vise 151 effectively pivots about the rod centerline. In summary, in the process of breaking (loosening) a rod joint, jaws 152 are closed on the rod when the vise 151 is in its untilted position (cylinder 156 retracted), and then cylinder 156 is extended so that vise 151 moves to its tilted position, partially unscrewing the endmost rod in the process. At that point, jaws 152 are released and cylinder 156 is retracted to return the vise to its starting position.

Vise 150 is an optional component. For some types of rod strings, the spinning assembly 140 by itself can be used to unthread the endmost rod, especially if the spinner is made large enough to exert a higher level of torque on the rod string. However, it has been found advantageous according to the invention to use a smaller, less powerful spinner in combination with a vise that pivots over a limited range sufficient to loosen the joint so that the spinner can then unthread the rod the rest of the way, and to operate these devices using control hydraulics according to the series of steps described above.

Figures 31, 32:
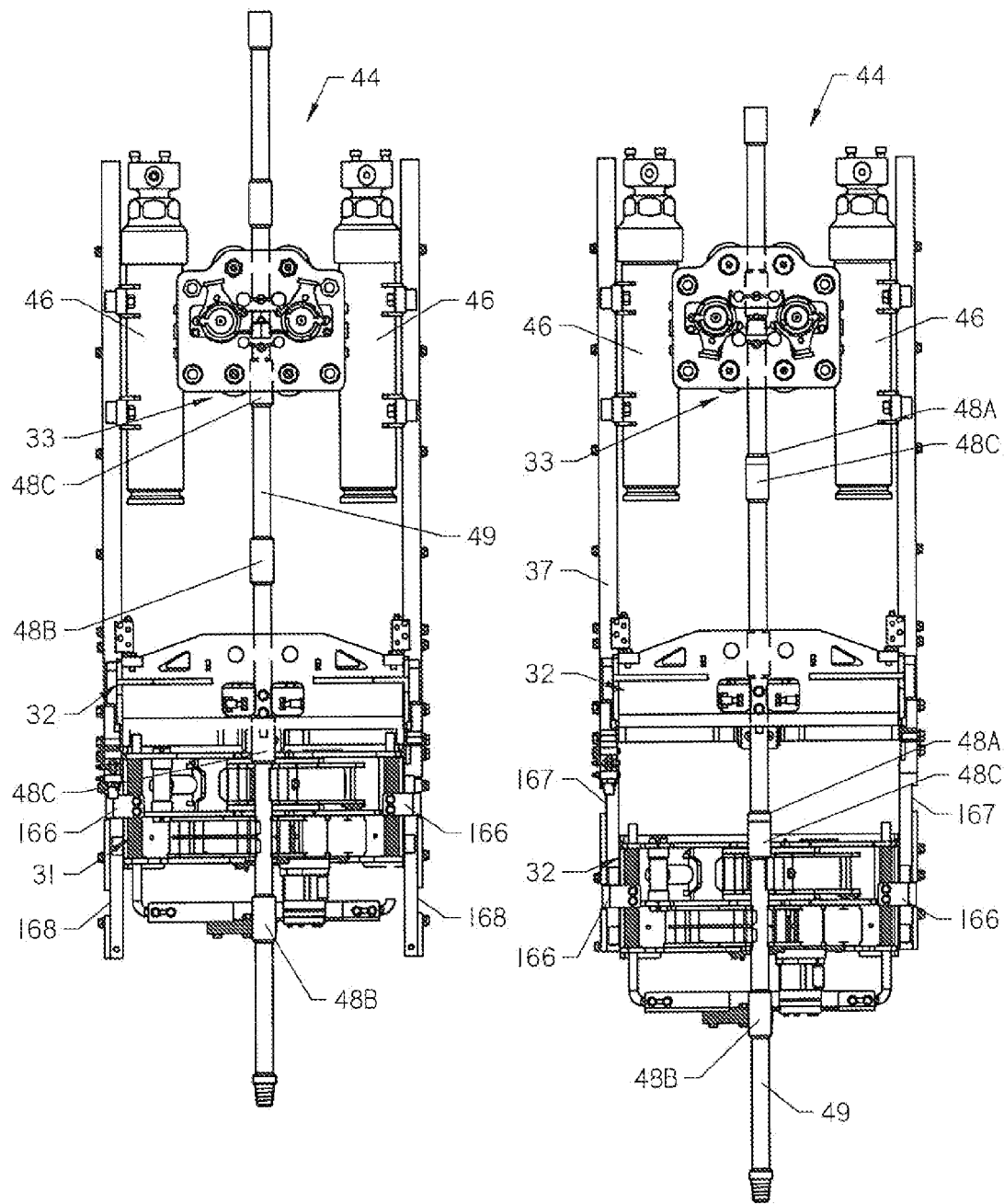
FIG. 31 is a top view of the ratchet block, bungee vise, and spinner engaging a drill string in "−" or pullback mode.
FIG. 32 is the same view as FIG. 31, repositioned for "+" or payout mode.

With the use of upset rods 49 as disclosed herein, the spinner 31 must be positioned at a location that puts drive wheel 146 and jaws 152 in appropriate axial orientation with respect to the rod 49. These positions are set using a pair of L-shaped tabs 166 that extend outwardly and then downwardly from the sides of frame 141. As shown in FIGS. 3, 31 and 32, the bottom ends of tabs 166 extend outwardly past wheels 142 and rail 37 into one of two pairs of front and rear slots 167, 168. Slots 167 and 168 are defined by a pair of bars 169 bolted to the sides of rails 37, which rails become narrower at the front end of front slots 167.

At their inner ends, tabs 166 are bolted to respective spring shafts 171 that run along the sides of spinner 31 through holes in front and rear upright plates 172, 173 forming part of the frame 141. The hole through rear plates 173 is a groove 174 elongated in a vertical direction, and shafts 171 fit loosely in the front holes 175 to permit the entire assembly to pivot as described hereafter. A pair of compression springs 176 are mounted ahead of and behind each tab 166, with distal ends in contact with plates 172, 173 respectively. Front ends of spring shafts 171 are secured by bolts to opposite ends of a lift handle 177 running along the back of spinner 31, thereby forming a forwardly opening U-shaped assembly. A series of sheets of an elastic bendable material such as HDPE are bolted to the rear face of handle 177 to form a rod support cradle 178 positioned to support a rod to be added to the rod string prior to threading in, or a rod recently unthreaded from the rod string. With tabs 166 confined in one pair of slots 167 or 168, frame 141 and all of the parts mounted thereon, including spinning assembly 140 and torque vise 150, are biased to a position centered on tabs 166 by springs 176. This mechanism allows spinning assembly 140 to move a short distance relative to the rod during threading and unthreading, which distance corresponds to the length of the threaded rod ends, and then return to a nominal position. The flexibility of cradle 178 aids a new rod to travel across the cradle as it is moved by ratchet block mechanism 33.

Springs 176 allow some movement of the assemblies away from the centered position as will normally occur during use. Threading or unthreading a rod joint will push the device, through the spinner arm 144, either forward or back. Once the threading operation is completed, the springs 176 return frame 141 to its nominal centered start position. Tabs 166 can be moved from one set of slots 167 or 168 to the other by manually lifting and pulling on handle 177. Elongated grooves 174 aid in allowing the operator to lift handle 177 in a manner effective to lift tabs 166 out of and into slots 167 or 168.

Referring to FIGS. 31-34, the positions of slots 167 are 168 are selected such that front slots 167 are located for pullback mode and the rear slots 168 for payout mode. Each rod 49 has a male end upset 48A, a middle upset 48B, and female end upset 48C. With the male end of one rod threaded into the female end of the next, the length of the male and female end upsets when end-to-end together equals the length of middle upset 48B. In the rod string 44, therefore, there are effectively two upsets per rod, one coinciding with a joint, and all upsets 48 being evenly spaced along the length of the string. This configuration is preferred in that it keeps the length and weight of individual rods 49 within reasonable limited while permitting the mechanism to make sufficient progress per stroke. However, other arrangements of upsets could be employed, such as three upsets per rod instead of two, with corresponding changes in the design of the machine.

In pullback or "minus" mode as shown in FIG. 31, the pawls of ratchet block mechanism 33 are in front of an upset 48, in this example upsets 48A, 48C at a joint. Bungee vise 32 grips the minor diameter of a rod 49 just in front of a male end upset 48A, holding the rod string from being pulled back into the hole and gripping the second to last rod 49, so that the torque vise 150 can unscrew the last rod 49. Vise 150 grips the minor diameter of the last rod 49 just behind female upset 48C.

In payout or "plus" mode as shown in FIG. 32, the pawls of ratchet block mechanism 33 are shifted forward to a position behind an upset 48, in this example the upset 48B in front of the joint where the ratchet block mechanism 33 was located in pullback mode. Bungee vise 32 grips the minor diameter of a rod 49 just behind middle upset 48B of the second to last rod. Since bungee vise 32 is essentially stationary (moves only over a narrow range as described above), spinner 31 must be repositioned rearwardly so that it can again engage the minor diameter of the last rod 49 just behind female upset 48C. Accordingly, rear slots 168 used for payout mode are spaced from front slots 167 by the amount of the offset in the position of the rod string in the foregoing operations. Changeover from one mode to the other is accomplished by manually lifting and repositioning using handle 177.

In operation, the operator controls cycles cylinders 46 by means of a first lever on control station 21. A second lever opens and closes bungee vise 32, subject however to the overriding effect of hydraulic switch 137 when in pullback mode. A third lever actuates hydraulic logic that cycles cylinders 156, 158 to engage, turn, and then disengage the torque vise 150 in either a clockwise or counterclockwise direction. A fourth lever actuates hydraulic logic that closes, spins and then opens spinning assembly 140. This hybrid control system (part automated, part manual) allows the operator to deal with unforeseen circumstances, as where the vise 150 fails to completely loosen a joint on the first try and another attempt must be made before the spinning assembly 140 can be activated.

During pullback, the cycle starts with a rearward stroke of the ratchet block mechanism in engagement with a rod upset as previously described. At the end of the stroke, vise 32 engages the rod string and holds it in tension relative to the borehole. During a typical job, rod string 44 ends in a conventional pipe bursting head or mole that progressively breaks up an existing pipe as it is pulled through the ground. The pipe bursting head has a replacement pipe connected to it in a trailing position that is pulled in to replace the old pipe in a manner well known in the art. The replacement pipe has considerable weight and is somewhat resilient. As the replacement pipe comes into frictional engagement with the surrounding soil, the pullback forces against bungee vise 32 become substantial.

Torque vise 150 of spinner 31 then engages the last rod in string 44 and rotates it over a short angle (about 30 degrees) sufficient to loosen the joint. Vise 150 then releases the last rod 49, and spinning assembly 140 engages it. Drive wheel 146 is activated by motor 147, completely uncoupling the last rod 49 so that it rests on cradle 178, from which it is then removed by the operator and placed in rod box 20. The operator then cycles ratchet block assembly forward for another stroke and sets bungee vise 32 to open. The actual timing of when vise 32 opens is determined by when the load on the rod string is sufficiently taken up by the pawls 77 of the ratchet block mechanism 33, as determined by hydraulic switch 137. The cycle is then repeated. In the embodiment shown, with two upsets per rod, each stroke of the main thrust cylinders 46 is half the length of a rod, the distance between two adjacent upsets 48. Thus the spinner 31 is activated every other cycle.

Payout is the foregoing process in reverse, with simplifications. Ratchet block mechanism 33 is reset from (−) to (+) positions, and spinner 31 is manually repositioned. Hydraulic switch 137 does not affect operator control of the bungee vise, and new rods are added without use of torque vise 150. Often the rod string during payout is being fed through the interior of an existing pipeline due to be replaced, and as such is not under great tension. Once the lead rod has emerged into the entry pit for the tooling, the tooling is attached, the direction of operation of pipe pulling and pushing machine 10 is reversed, and the pullback process begins.

While certain embodiments of the invention have been illustrated for the purposes of this disclosure, numerous changes in the method and apparatus of the invention presented herein may be made by those skilled in the art, such changes being embodied within the scope and spirit of the present invention as defined in the appended claims. For example, while the invention has been discussed as using a pair of identical pawls on opposite sides of the rod string, it is possible to use a single pivoting pawl to engage a rod upset. Similarly, a vise mechanism can comprise two symmetrical moving jaws, or in the alternative a moving jaw and a stationary jaw. A pair of symmetrically placed main thrust cylinders for use with the ratchet block mechanism is preferred, but a single, centrally positioned thrust cylinder could be used. In the bungee vise, the actuator shown is a hydraulic cylinder, but a manually operated vise actuating mechanism could be used. The machine is described is a single unit, but components of the machine could be designed in a modular fashion for assembly and disassembly at the job site, in order to reduce the weight of each piece. In such a case the housing of the unit as a whole would be the assembly of the housings of each component. These and other modifications are within the scope of the claims that follow.

The invention claimed is:

1. A rod string pushing and pulling machine for use with a rod string comprising a series of rods coupled to one another end to end, wherein each rod comprises an upset, the rod string pushing and pulling machine comprising:
    a housing including a front shore plate having an access opening therein through which the rod string extends from the housing;
    a carriage supported by the housing;
    a holding mechanism mounted on the carriage, wherein the holding mechanism comprises a pair of opposing pawls configured to engage the upset so that a pushing or pulling movement of the carriage in opposite directions causes pushing or pulling movement of the rod string;
    a hydraulic thrust cylinder supported by the housing for pushing and pulling the carriage and the rod string, when the pawls are engaged with the upset, upon extension or retraction of the thrust cylinder; and
    a bungee vise mounted on the housing, the bungee vise having a pair of jaws and an actuator that causes the jaws to engage the upset of a rod supported within the bungee vise to hold the rod string against longitudinal movement when the upset of the rod supported within the holding mechanism is not engaged, and disengage when the upset of the rod supported within the holding mechanism is engaged by the holding mechanism during push and pull movement of the rod string.

2. The rod string pushing and pulling machine of claim 1, wherein the bungee vise is slidably mounted on a track on the housing for movement with the carriage during operation of the hydraulic thrust cylinder.

3. The rod string pushing and pulling machine of claim 2, wherein the bungee vise includes a hydraulic cylinder for actuating the jaws.

4. The rod pushing and pulling machine of claim 1 wherein the holding mechanism grips a segment of the rod adjacent to the upset when the holding mechanism engages the upset.

5. The rod string pushing and pulling machine of claim 1 further comprising a spinner mounted on the housing and configured for threading and unthreading the rods from the rod string.

6. The rod string pushing and pulling machine of claim 5 wherein the spinner comprises a pair of opposing jaws supported on a pair of opposing torque arms, wherein the opposing jaws and torque arms are configured to grip the rod disposed within the spinner and rotate about a centerline of the rod to either make or break a thread joint of the rod disposed within the spinner and the rod string.

7. The rod string pushing and pulling machine of claim 5 wherein the spinner comprises a drive wheel adapted to engage a rod disposed within the spinner to thread or unthread the rod disposed within the spinner from the rod string.

8. The rod string pushing and pulling machine of claim 1 wherein the carriage further comprises a plurality of guide rollers configured to substantially center the rod string within the holding mechanism.

9. The rod string pushing and pulling machine of claim 1 wherein the holding mechanism comprises a pair of pawls supported by the carriage and configured to engage a shoulder of the upset.

10. The rod string pushing and pulling machine of claim 9 wherein the pawls are pivotal to engage the shoulder of the upset during both pushing and pulling of the rod string.

11. The rod string pushing and pulling machine of claim 1 wherein the bungee vise comprises a plurality of guide rollers configured to substantially center the rod string within the bungee vise.

12. The rod string pushing and pulling machine of claim 1 wherein the pair of jaws comprise a first conical shoulder to abut the upset during a pulling operation and a second conical shoulder to abut the upset during a pushing operation.

13. A rod pushing and pulling machine for use with a rod string comprising a series of threaded rods coupled to one another end to end, wherein each rod comprises an upset, the machine comprising:
 a housing including a front shore plate having an access opening therein through which the rod string extends;
 a carriage supported by the housing for movement in a direction of travel;
 a holding mechanism supported by the carriage to releasably engage the upset of the rod supported within the holding mechanism so that pushing or pulling movement of the carriage in opposite directions causes pushing or pulling movement of the rod string;
 a hydraulic thrust cylinder supported by the housing and connected to the carriage for pushing and pulling the carriage upon extension or retraction of the thrust cylinder;
 a spinner mounted on the housing and configured for threading and unthreading the rods from the rod string; and
 a bungee vise supported on a track on the housing between the spinner and the carriage for movement over a limited range in the direction of travel of the carriage, the bungee vise having a pair of jaws and an actuator that causes the jaws to engage the upset of a rod supported within the bungee vise to hold the rod string against longitudinal movement when the upset of the rod supported within the holding mechanism is not engaged, and disengage when the upset of the rod supported within the holding mechanism is engaged by the holding mechanism.

14. The rod pushing and pulling machine of claim 13, wherein the bungee vise includes a hydraulic cylinder for actuating the jaws of the bungee vise.

15. The rod pushing and pulling machine of claim 14, wherein the bungee vise is confined for sliding movement by stops in front of and behind the bungee vise.

16. The rod pushing and pulling machine of claim 13, wherein the holding mechanism comprises a means for gripping the rod and engaging the upset.

17. The rod pushing and pulling machine of claim 13, further comprising a control system to actuate the hydraulic thrust cylinder to control push or pull movement of the carriage, to engage or release the rod string with the bungee vise, and to engage or release the rod string from the carriage.

18. The rod pushing and pulling machine of claim 13 wherein the holding mechanism grips a segment of the rod adjacent to the upset when the holding mechanism engages the upset.

19. The rod pushing and pulling machine of claim 13 wherein the spinner comprises a pair of opposing jaws supported on a pair of opposing torque arms, wherein the torque jaws and torque arms are configured to grip the rod disposed within the spinner and rotate about a centerline of the rod to either make or break a thread joint of the rod disposed within the spinner and the rod string.

20. The rod pushing and pulling machine of claim 19 wherein the spinner comprises a drive wheel adapted to engage a rod disposed within the spinner to thread or unthread the rod disposed within the spinner from the rod string.

21. The rod pushing and pulling machine of claim 13 wherein the carriage further comprises a plurality of guide rollers configured to substantially center the rod string within the holding mechanism.

22. The rod pushing and pulling machine of claim 13 wherein the holding mechanism comprises a pair of pawls supported by the carriage and configured to engage a shoulder of the upset.

23. The rod pushing and pulling machine of claim 22 wherein the pawls are pivotal to engage the shoulder of the upset during both pushing and pulling of the rod string.

24. The rod pushing and pulling machine of claim 13 wherein the bungee vise comprises a plurality of guide rollers configured to substantially center the rod string within the bungee vise.

25. The rod pushing and pulling machine of claim 13 wherein the pair of jaws comprise a first conical shoulder to abut the upset during a pulling operation and a second conical shoulder to abut the upset during a pushing operation.

26. A method for adding rods to makeup a rod string comprised of a plurality of rods, wherein each rod comprises an upset, the method comprising:
 (a) providing a rod pushing and pulling machine comprising a housing;
 (b) thrusting the rod string and a carriage engaging the rod string forward using a hydraulic thrust cylinder supported by the housing;
 (c) engaging the upset of the rod of the rod string disposed within a bungee vise supported on the housing;
 (d) disengaging the upset of the rod disposed within the carriage;
 (e) operating the hydraulic thrust cylinder to position the carriage for a thrusting stroke while holding the rod string against longitudinal movement with the bungee vise;
 (f) positioning an additional rod within a spinner mounted on the housing and rotating the additional rod to thread the additional rod onto the rod string;

(g) re-engaging the upset of the rod disposed within the carriage;
(h) releasing the rod disposed within the bungee vise; and
(i) repeating (h) through (h).

27. A method for removing rods to breakout a rod string comprised of a plurality of rods, wherein each rod comprises an upset, the method comprising:
   (a) providing a rod pushing and pulling machine comprising a housing;
   (b) pulling the rod string and a carriage engaging the rod string backward using a hydraulic thrust cylinder supported by the housing;
   (c) engaging the upset of the rod of the rod string disposed within a bungee vise supported on the housing;
   (d) disengaging the upset of the rod disposed within the carriage;
   (e) operating the hydraulic thrust cylinder to position the carriage for a pulling stroke while holding the rod string against longitudinal movement with the bungee vise;
   (f) positioning a rod of the rod string within a spinner mounted on the housing and rotating the rod to unthread the rod from the rod string;
   (g) re-engaging the upset of the rod disposed within the carriage;
   (h) releasing the rod disposed within the bungee vise; and
   (i) repeating (b) through (h).

28. A rod string pushing and pulling machine for use with a rod string comprising a series of rods coupled to one another end to end, wherein each rod comprises an upset, the rod string pushing and pulling machine comprising:
   a housing including a front shore plate having an access opening therein through which the rod string extends from the housing;
   a carriage supported by the housing;
   a holding mechanism mounted on the carriage, wherein the holding mechanism comprises a pair of opposing pawls configured to engage the upset so that a pushing or pulling movement of the carriage in opposite directions causes pushing or pulling movement of the rod string;
   a hydraulic thrust cylinder supported by the housing for pushing and pulling the carriage and the rod string, when the pawls are engaged with the upset, upon extension or retraction of the thrust cylinder; and
   a bungee vise mounted on the housing, the bungee vise having a pair of jaws and an actuator that causes the jaws to engage the upset of a rod supported within the bungee vise to hold the rod string against longitudinal movement when the upset of the rod supported within the holding mechanism is not engaged, and disengage when the upset of the rod supported within the holding mechanism is engaged by the holding mechanism during push and pull movement of the rod string; wherein the bungee vise is slidably mounted on a track on the housing for movement with the carriage during operation of the hydraulic thrust cylinder.

* * * * *

UNITED STATES PATENT AND TRADEMARK OFFICE
CERTIFICATE OF CORRECTION

PATENT NO. : 8,157,478 B2
APPLICATION NO. : 11/407679
DATED : April 17, 2012
INVENTOR(S) : Wentworth et al.

Page 1 of 1

It is certified that error appears in the above-identified patent and that said Letters Patent is hereby corrected as shown below:

Column 15, line 4 please delete the first occurrence of "(h)" and substitute therefore --(b)--.

Signed and Sealed this
Fifth Day of June, 2012

David J. Kappos
*Director of the United States Patent and Trademark Office*